(12) United States Patent
Mochizuki et al.

(10) Patent No.: US 9,099,106 B2
(45) Date of Patent: *Aug. 4, 2015

(54) MULTILAYER STRUCTURE SHEET AND METHOD FOR MANUFACTURING SAME, AND OPTICAL INFORMATION RECORDING MEDIUM AND METHOD FOR MANUFACTURING OPTICAL INFORMATION RECORDING MEDIUM USING MULTILAYER STRUCTURE SHEET

(71) Applicant: FUJIFILM Corporation, Minato-ku, Tokyo (JP)

(72) Inventors: Hidehiro Mochizuki, Odawara (JP); Tatsuo Mikami, Odawara (JP); Toshiyuki Kitahara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,881

(22) Filed: Jan. 9, 2014

(65) Prior Publication Data

US 2014/0120295 A1 May 1, 2014

Related U.S. Application Data

(63) Continuation of application No. PCT/JP2012/062465, filed on May 16, 2012.

(30) Foreign Application Priority Data

Jul. 13, 2011 (JP) .................................. 2011-154996

(51) Int. Cl.
*G11B 7/24* (2013.01)
*G11B 7/256* (2006.01)
(Continued)

(52) U.S. Cl.
CPC ................ *G11B 7/256* (2013.01); *G11B 7/245* (2013.01); *G11B 7/246* (2013.01); *G11B 7/26* (2013.01); *G11B 7/00452* (2013.01); *Y10T 428/1476* (2015.01); *Y10T 428/24942* (2015.01)

(58) Field of Classification Search
CPC ........ G11B 7/256; G11B 7/246; G11B 7/245; G11B 7/26; G11B 7/00452; Y10T 428/24942; Y10T 428/1476
See application file for complete search history.

(56) References Cited

U.S. PATENT DOCUMENTS 8,202,597 B2 *  6/2012 Ishida et al. .................. 428/64.1
8,477,577 B2 *  7/2013 Sasaki et al. ............... 369/47.15
(Continued)

FOREIGN PATENT DOCUMENTS

JP     2005-209328 A      8/2005
JP     2008-262650    *  10/2008
(Continued)

OTHER PUBLICATIONS

International Search Report of PCT/JP2012/062465 dated Aug. 21, 2012, 5 pages in Japanese and English.

*Primary Examiner* — Martin Angebranndt
(74) *Attorney, Agent, or Firm* — Sughrue Mion, PLLC

(57) ABSTRACT

A multilayer structure sheet for manufacturing an optical information recording medium having a multilayer structure with a plurality of recording layers is disclosed. The multilayer structure sheet comprises at least one unit structure in which a pressure sensitive adhesive layer, a recording layer, a recording layer support layer having a glass transition temperature higher than that of the pressure sensitive adhesive layer, and a recording layer are laid one on top of another in this order, and a release sheet is attached to an outside of an outermost pressure sensitive adhesive layer.

19 Claims, 12 Drawing Sheets

(51) Int. Cl.
*G11B 7/26* (2006.01)
*G11B 7/245* (2006.01)
*G11B 7/246* (2013.01)
*G11B 7/0045* (2006.01)

(56) References Cited

U.S. PATENT DOCUMENTS

| | | | |
|---|---|---|---|
| 8,526,291 B2* | 9/2013 | Mochizuki et al. | 369/275.3 |
| 8,701,133 B2* | 4/2014 | Kitahara | 720/718 |
| 2003/0179687 A1* | 9/2003 | Schoeppel et al. | 369/273 |
| 2005/0142318 A1 | 6/2005 | Nakabayashi et al. | |
| 2010/0056775 A1* | 3/2010 | Tomura et al. | 540/121 |
| 2010/0143638 A1* | 6/2010 | Nakabayashi | 428/65.1 |
| 2011/0080824 A1 | 4/2011 | Ito et al. | |
| 2011/0085437 A1* | 4/2011 | Ito et al. | 369/283 |
| 2014/0023816 A1* | 1/2014 | Kitahara | 428/64.9 |
| 2014/0064053 A1* | 3/2014 | Tsuyama et al. | 369/100 |
| 2014/0087114 A1* | 3/2014 | Ito et al. | 428/65.1 |
| 2014/0193601 A1* | 7/2014 | Mikami et al. | 428/41.8 |
| 2014/0219072 A1* | 8/2014 | Singer et al. | 369/275.3 |
| 2014/0342159 A1* | 11/2014 | Mikami et al. | 428/412 |

FOREIGN PATENT DOCUMENTS

| | | |
|---|---|---|
| JP | 2009-238315 A | 10/2009 |
| JP | 2009-277271 | * 11/2009 |
| JP | 2011-081860 A | 4/2011 |

* cited by examiner (a)

(b)

(c)

(a)

(b)

(c)

(a)

(b)

MULTILAYER STRUCTURE SHEET AND METHOD FOR MANUFACTURING SAME, AND OPTICAL INFORMATION RECORDING MEDIUM AND METHOD FOR MANUFACTURING OPTICAL INFORMATION RECORDING MEDIUM USING MULTILAYER STRUCTURE SHEET

CROSS-REFERENCE TO RELATED APPLICATION(S)

This application is a continuation of International Application No. PCT/JP2012/062465, filed on May 16, 2012, which claims priority from Japanese Patent Application No. 2011-154996, filed on Jul. 13, 2011 in the Japan Patent Office, the disclosure of which is herein incorporated by reference in its entirety.

BACKGROUND

1. Field

The present invention relates to a multilayer structure sheet for manufacturing an optical information recording medium having a multilayer structure with a plurality of recording layers, a method for manufacturing a multilayer structure sheet, an optical information recording medium having a multilayer structure with a plurality of recording layers, and a method for manufacturing an optical information recording medium using a multilayer structure sheet.

2. Description of Related Art

Conventionally, as a method for manufacturing an optical information recording medium having a multilayer structure with a plurality of recording layers, a method using a multilayer structure sheet having laminates of a recording layer and a pressure sensitive adhesive layer is known in the art (e.g., Patent Literature 1). To be more specific, a multilayer structure sheet described in Patent Literature 1 has a release film attached to each of outer surfaces of a laminate of recording and pressure sensitive layers. By peeling this release film off the multilayer structure sheets and stacking and sticking the sheets over a substrate repeatedly one on top of another, an optical information recording medium having a multilayer structure can be obtained. In this type of manufacturing method using a multilayer structure sheet, a large-area optical information recording medium can be manufactured by preparing a large-size multilayer structure sheet.

However, the multilayer structure sheet as described in Patent Literature 1 is configured to have a release film attached to the recording layer, and thus involves a risk of cracking occurring in the recording layer when the release film is peeled off. With this in view, there is proposed a multilayer structure sheet so configured as to have a release film not directly attached to any recording layer (e.g., Patent Literature 2). To be more specific, the multilayer structure sheet described in Patent Literature 2 has a multilayer structure comprising a pressure sensitive adhesive layer, a recording layer and a release assisting layer arranged in this order, and a release film is attached to each of the outermost layers that are the pressure sensitive adhesive layer and the release assisting layer. With this configuration in which the recording layer is sandwiched between the pressure sensitive adhesive layer and the release assisting layer as described above, cracking in the recording layer when the release film is peeled off can be prevented from occurring.

CITATION LIST

Patent Literature(s)

Patent Literature 1: JP 2005-209328 A
Patent Literature 2: JP2011-81860 A

SUMMARY

Hereupon, formation of a multilayer structure on a substrate using a multilayer structure sheet disclosed in Patent Literature 2 provides a structure with a pressure sensitive adhesive layer and a release assisting layer interposed between two adjacent recording layers. However thus-provided structure with two layers interposed between the two adjacent recording layers has interfaces of three kinds which include: an interface between the recording layer and the pressure sensitive adhesive layer, an interface between the pressure sensitive adhesive layer and the release assisting layer, and an interface between the release assisting layer and the recording layer. With this configuration, the materials for the pressure sensitive adhesive layer and the release assisting layer should be selected such that the difference in refractive index between the pressure sensitive adhesive layer and the release assisting layer is minimized toward zero because no refraction at the interface between the pressure sensitive adhesive layer and the release assisting layer is desired. In addition, interaction (dissolution, erosion) between three kinds of materials which include the material for the recording layer should be taken into consideration, and thus a selection of the materials for each layer is further limited.

Against this backdrop, the present inventors who noted this aspect have created the present invention during their efforts of research made in an attempt to provide a multilayer structure sheet and a manufacturing method therefor, and an optical information recording medium and a manufacturing method therefor, by which cracking which would occur in a recording layer during manufacture of an optical information recording medium using a multilayer structure sheet can be prevented while a selection of the materials for each layer can be offered with increased flexibility.

In one aspect of the present invention, there is provided a multilayer structure sheet for manufacturing an optical information recording medium having a multilayer structure with a plurality of recording layers. This multilayer structure sheet comprises at least one unit structure in which a pressure sensitive adhesive layer, a recording layer, a recording layer support layer having a glass transition temperature higher than that of the pressure sensitive adhesive layer, and a recording layer are laid one on top of another in this order, and a release sheet attached to an outside of an outermost pressure sensitive adhesive layer.

With this configuration, only two kinds of interfaces are provided therein which include an interface between a pressure sensitive adhesive layer and a recording layer, and an interface between a recording layer and a recording layer support layer; therefore, improved flexibility is offered in selection of materials for respective layers in comparison with another configuration in which three or more kinds of interfaces are present. Furthermore, with this configuration in which the release film is not directly attached to any recording layer, cracking in the recording layer when the release film is peeled off can be prevented from occurring.

In the multilayer structure sheet as described above, the recording layer may be configured to include a polymer binder, and a dye dispersed in the polymer binder. With this configuration, recording can be achieved by causing an interface bounding the recording layer to deform. This dye may be configured to include a multiphoton absorption compound. Use of the multiphoton absorption compound enables selective absorption occurring only at and around a focal point, making it possible to effect recording only in a specific recording layer as specified simply through adjustment of the focal point, and thus is advantageous to a desired increase in the number of the recording layers.

The aforementioned recording layer may be configured to include a polymer to which a dye is bonded.

In the multilayer structure sheet as described above, the recording layer may have a thickness of 50 nm or greater. With this configuration, a recorded spot can be so deformed that a center thereof protrudes out.

In the multilayer structure sheet as described above, a plurality of the unit structures may be laminated on the release sheet.

In the multilayer structure sheet as described above, the recording layer support layer may include an energy curable type resin. With this configuration, application thereof to an appropriate thickness can be achieved easily and curing thereof can be completed quickly, in the process of manufacture of the multilayer structure sheets. It is generally appreciated that an energy curable type resin film obtained by three-dimensional cross-linking has high resistance to organic solvents which means that it is insoluble in the organic solvents. Therefore, when a recording layer is laminated on an energy curable type resin film, spin coating, blade coating or any other application method using an organic solvent can be adopted.

The aforementioned energy curable type resin may preferably be an ultraviolet curable resin. The ultraviolet curable resin is a material which is caused to cure by application of easy-to-handle ultraviolet rays, such that a recording layer support layer can thus be formed therewith easily; therefore, it is advantageous to use it for manufacture of a large-area multilayer structure sheet.

In the multilayer structure sheet as described above, it may be preferable that a difference in refractive index for a recording beam between the recording layer support layer and the recording layer is 0.05 or smaller. The recording beam may be configured to have a wavelength of 405 nm, for example. With this configuration, reflection which takes place at an interface between the recording layer support layer and the recording layer can be minimized.

In the multilayer structure sheet as described above, it may be preferable that a difference in refractive index for a recording beam between the pressure sensitive adhesive layer and the recording layer is greater than a difference in refractive index for the recording beam between the recording layer support layer and the recording layer. With this configuration, the quantity of light to be reflected off the interface between the pressure sensitive adhesive layer and the recording layer at which information is recorded can be increased so that a signal-to-noise ratio observed when information is retrieved therefrom can be increased.

In the multilayer structure sheet as described above, each of the pressure sensitive adhesive layer and the recording layer support layer may be of a material which is substantially nonabsorptive of a recording beam. With this configuration, the recording beam can easily be caused to reach a recording layer located at a lower level.

In the multilayer structure sheet as described above, each of the pressure sensitive adhesive layer and the recording layer support layer may be configured to have a thickness in a range of 2 to 20 micrometer.

In another aspect of the present invention, an optical information recording medium having a multilayer structure with a plurality of recording layers is provided. This optical information recording medium is configured such that one of a pressure sensitive adhesive layer and a recording layer support layer having a glass transition temperature higher than that of the pressure sensitive adhesive layer is provided between two adjacent recording layers, wherein the pressure sensitive adhesive layer and the recording layer support layer are disposed alternately with each other.

With this configuration, the multilayer structure includes only two kinds of interfaces which include an interface between a pressure sensitive adhesive layer and a recording layer, and an interface between a recording layer and a recording layer support layer; therefore, improved flexibility is offered in selection of materials for respective layers in comparison with another configuration in which three or more kinds of interfaces are present.

The optical information recording medium as described above may be configured such that information is recordable by irradiation with a recording beam causing an interface between the recording layer and the pressure sensitive adhesive layer to deform.

The multilayer structure sheet as described above may be manufactured by a method comprising the following steps. To be more specific, a method for manufacturing a multilayer structure sheet as one aspect of the present invention comprises: a first step of forming a pressure sensitive adhesive layer on a first release sheet to obtain a first sheet; a second step of forming a recording layer support layer on a second release sheet; a third step of forming a recording layer on the recording layer support layer to obtain a second sheet; a fourth step of stacking the second sheet on the first sheet by laminating the pressure sensitive adhesive layer and the recording layer together to obtain a third sheet; a fifth step of removing the second release sheet from the third sheet to expose the recording layer support layer; and a sixth step of forming a recording layer on the recording layer support layer exposed in the fifth step to obtain a fourth sheet.

With this method for manufacturing a multilayer structure sheet, each interface between the layers formed in the manufacturing process has only two kinds which include an interface between a pressure sensitive adhesive layer and a recording layer, and an interface between a recording layer and a recording layer support layer; therefore, improved flexibility is offered in selection of materials for respective layers in comparison with another configuration in which three or more kinds of interfaces are present. Furthermore, with this configuration in which there is no step of removing a release sheet from the recording layer, cracking in the recording layer can be prevented from occurring.

The aforementioned method for manufacturing a multilayer structure sheet may comprise a seventh step of removing the first release sheet from at least one of a plurality of the fourth sheets obtained by repeatedly performing the first to sixth steps to obtain one or more fifth sheets of which the pressure sensitive adhesive layer is exposed; and an eighth step of stacking and sticking the one or more fifth sheets on the recording layer of another fourth sheet which is an outermost layer.

A method for manufacturing an optical information recording medium having a multilayer structure with a plurality of recording layers, using the aforementioned multilayer structure sheet comprises: a preliminary step of providing a plurality of multilayer structure sheets; a release step of removing release sheets from the plurality of multilayer structure sheets to obtain first multilayer structure sheets of which the pressure sensitive adhesive layers are exposed; a sticking step of sticking one first multilayer structure sheet to a substrate by laminating the exposed pressure sensitive adhesive layer of the first multilayer structure sheet on the substrate; and a first laminating step of stacking another first multilayer structure sheet on the first multilayer structure sheet stuck to the substrate by laminating the another first multilayer structure sheet on the first multilayer structure sheet stuck to the substrate.

With this method for manufacturing an optical information recording medium, each interface between the layers formed in the manufacturing process has only two kinds which include an interface between a pressure sensitive adhesive layer and a recording layer, and an interface between a recording layer and a recording layer support layer; therefore, improved flexibility is offered in selection of materials for respective layers in comparison with another configuration in which three or more kinds of interfaces are present.

A method for manufacturing an optical information recording medium having a multilayer structure with a plurality of recording layers, using the aforementioned multilayer structure sheet comprises: a preliminary step of providing a plurality of multilayer structure sheets which include a second multilayer structure sheet; a release step of removing a release sheet from at least one multilayer structure sheet of the plurality of multilayer structure sheets other than the second multilayer structure sheet to obtain at least one third multilayer structure sheet having an exposed pressure sensitive adhesive layer; a second laminating step of stacking the at least one third multilayer structure sheet on the second multilayer structure sheet by laminating the exposed pressure sensitive adhesive layer of the at least one third multilayer structure sheet on an outermost recording layer of the second multilayer structure sheet or the at least one third multilayer structure sheet; and a sticking step of sticking on a substrate the second multilayer structure sheet on which the at least one third multilayer structure sheet is stacked, by removing a release sheet of the second multilayer structure sheet with the at least one third multilayer structure sheet laminated thereon and laminating on the substrate a pressure sensitive adhesive layer thereof exposed by removing the release sheet.

With this method for manufacturing an optical information recording medium, each interface between the layers formed in the manufacturing process has only two kinds which include an interface between a pressure sensitive adhesive layer and a recording layer, and an interface between a recording layer and a recording layer support layer; therefore, improved flexibility is offered in selection of materials for respective layers in comparison with another configuration in which three or more kinds of interfaces are present.

According to one or more of embodiments of the present invention, considerations to be taken can be focused only on the interface between a pressure sensitive adhesive layer and a recording layer, and an interface between a recording layer and a recording layer support layer; therefore, improved flexibility is offered in selection of their materials.

The above aspects and advantages, and other advantages and further features, of the present invention will be more apparent by describing in detail illustrative, non-limiting embodiments thereof with reference to the accompanying drawings.

DESCRIPTION OF EMBODIMENT(S)

One embodiment of the present invention will be described below with reference to the drawings.

Figure 1:
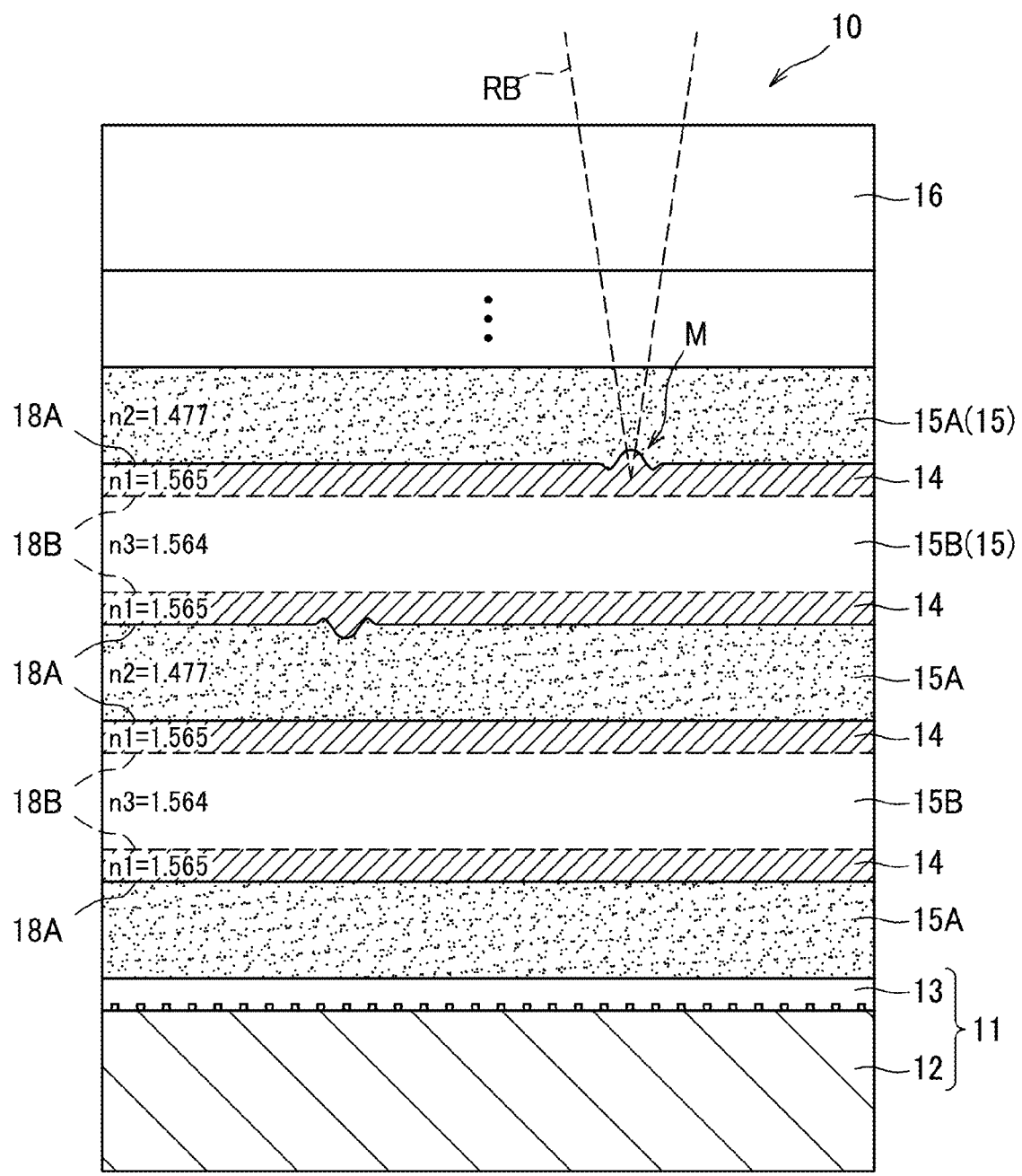
FIG. 1 is a sectional view of a multilayer optical information recording medium.

As shown in FIG. 1, an optical information recording medium 10 comprises a substrate 11, a plurality of recording layers 14, a plurality of intermediate layers 15 (pressure sensitive adhesive layers 15A and recording layer support layers 15B), and a cover layer 16. For convenience in describing this embodiment, an interface between a recording layer 14 and a pressure sensitive adhesive layer 15A will be referred to as a reflective interface 18A, and an interface between a recording layer 14 and a recording layer support layer 15B will be referred to as a non-reflective interface 18B.

<Substrate>

The substrate 11 comprises a support plate 12 and a servo signal layer 13.

The support plate 12 is a supporting member for supporting the recording layer 14 and other layers, and is made of a polycarbonate disc, for example. The material for the support plate 12 and its thickness are not limited in particular.

The servo signal layer 13 is a layer which is made of a tacky or adhesive resinous material to retain the multilayer structure of the recording layers 14 and the intermediate layers 15 on the support plate 12, and of which a support plate 12 side surface has a servo signal pre-recorded as irregularities in shape or variations in refractive index. Herein, the servo signal is a signal being preset so that a recording and reading apparatus can recognize it as a reference surface for focus control during the recording and reading processes. In order to bring a specific recording layer 14 into focus, the focusing control is exercised with consideration given to the distance measured and/or the number of interfaces counted from the reference surface. Furthermore, a track-following servo signal or groove may preferably be provided so that a track of circumferentially arranged recording spots can be illuminated accurately with a laser beam during the recording and reading processes. It is appreciated that presence or absence of the servo signal layer 13 is optional.

<Recording Layer>

The recording layer 14 is a layer made of a photosensitive material in which information is optically recordable; in this embodiment, the recording layer 14 contains a polymer binder and a dye dispersed in the polymer binder. When the recording layer 14 is irradiated with a recording beam, the dye absorbs the recording beam and generates heat, which causes the polymer binder to deform so as to provide the reflective interface 18A with a protrusive shape protruding into the pressure sensitive adhesive layer 15A, so that information is recorded. To be more specific, as will be described later, the center is shaped like a protrusion and its circumferential area is shaped like a recess such that the protrusive shape protruding from the recording layer 14 into the pressure sensitive adhesive layer 15A and the recess being set back from the pressure sensitive adhesive layer 15A into the recording layer 14 with reference to the recording layer 14.

To this end, the recording layer 14 is thicker than conventional recording layers containing a polymer binder and a dye; one recording layer 14 has a thickness in the range of 50 nm to 5 μm, preferably in the range of 100 nm to 3 μm, more preferably in the range of 200 nm to 2 μm. If the thickness is less than 50 μm, the interface between the recording layer 14 and the intermediate layer 15 (corresponding to the reflective interface 18A or the non-reflective interface 18B in this embodiment) deforms, such that a recessed shape is formed in the interface with reference to the recording layer 14, as in a conventional recording scheme using deformation of the recording layer (which will be described later). On the contrary, if the thickness not less than 50 μm is provided, the interface deforms such that the center of the recorded spot becomes a protrusion. Although the thickness of the recording layer 14 does not have an upper limit, it is preferable that the thickness thereof is not more than 5 μm in order to increase the number of recording layers 14 as many as possible. It is assumed that the recording layer 14 in this embodiment described herein has a thickness of 1 μm which is taken by way of example.

The number of the recording layers 14 provided may be approximately in the range of 2 to 100 layers. To increase the storage capacity of the optical information recording medium 10, the more the number of the recording layers 14, the better it may be; for example, it is preferable that ten or more layers are provided. Moreover, the refractive index of the recording layer 14 may change before and after recording, but the refractive index may preferably not change in order to maintain the non-refractive property of the non-reflective interface 18B before and after recording.

The recording layer 14 may preferably have a recording beam absorption ratio (of one-photon absorption) equal to or less than 5% per one layer. Further, this absorption ratio may be more preferably equal to or less than 2%, and furthermore preferably equal to or less than 1%. This is because, for example, if the intensity of the recording beam which reaches the deepest recording layer 14 has to be equal to or more than 50% of the intensity of the radiated recording beam, it is necessary that the absorption ratio per one recording layer is equal to or less than 2% in order to obtain thirty-layered recording layers, and it is necessary that the absorption ratio per one recording layer is equal to or less than 1% in order to obtain fifty-recording layers. If the absorption ratio is higher, the recording layer 14 is likely to be overheated and thus formation of a protrusive shape in the reflective interface 18A becomes difficult.

Examples of the polymer binder for use in the recording layer 14 may include polyvinyl acetate (PVAc), polymethylmethacrylate (PMMA), polyethylmethacrylate, polybutylmethacrylate, polybenzylmethacrylate, polyisobutylmethacrylate, polycyclohexylmethacrylate, polycarbonate (PC), polystyrene (PS), polyvinyl chloride (PVC), and polyvinyl alcohol (PVA), polyvinyl benzoate, poly(vinyl pivalate), polyethylacrylate, polybutylacrylate, and the like.

Examples of the recording beam-absorbing dye for use in the recording layer 14 may include dyes (one-photon absorption dyes) which have been conventionally used as a thermally deformable heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used. Further, for recording beam absorbing-dyes in a recording medium having a plurality of recording layers, those which contain a multi-photon absorption dye are preferable in order to minimize adverse effects on adjacent recording layers during recording/reading processes. As an example of the multi-photon absorption dye, a two-photon absorption compound having no linear absorption in the wavelength range of the reading beam is preferable.

As long as the two-photon absorption compound has no linear absorption in the wavelength range of the reading beam, any known two-photon absorption compound may be used without limitation; for example, compounds having a structure represented by the following general formula (1) may be used.

[Chem. 1]

General Formula (1)

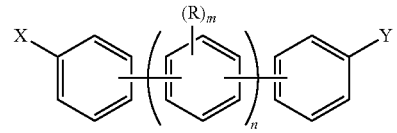

In the general formula (1), X and Y each represent a substituent having a Hammett's sigma-para value (σp value) of 0 or more, which may be the same as or different from each other; n represents an integer of 1 to 4; R represents a substituent, and a plurality of Rs may be the same as or different from each other; and m represents an integer of 0 to 4.

In the general formula (1), each of X and Y represents a group having a σp value taking a positive value in Hammett equation, i.e., what is called an electron-withdrawing group, preferably, e.g., a trifluoromethyl group, a heterocyclic group, a halogen atom, a cyano group, a nitro group, an alkylsulfonyl group, an arylsulfonyl group, a sulfamoyl group, a carbamoyl group, an acyl group, an acyloxy group, an alkoxycarbonyl group and the like, more preferably a trifluoromethyl group, a cyano group, an acyl group, an acyloxy group, and an alkoxycarbonyl group, and most preferably a cyano group and a benzoyl group. Of these substituents, an alkylsulfonyl group, an arylsulfonyl group, a sulfamoyl group, a carbamoyl group, an acyl group, an acyloxy group and an alkoxycarbonyl group may further have a substituent for various purposes including giving solubility in a solvent. The examples of the substituents include an alkyl group, an alkoxy group, an alkoxyalkyl group, an aryloxy group, etc.

n represents an integer of 1 or more and 4 or less, preferably 2 or 3, and most preferably 2. If n is 5 or more, it is said that the greater n becomes, the more the linear absorption appears at the longer wavelength side, so that non-resonant two-photon absorption recording is not done with a recording beam at a wavelength range shorter than 700 nm.

R represents a substituent. The substituent is not specifically limited, and an alkyl group, an alkoxy group, an alkoxyalkyl group, and an aryloxy group are exemplified as specific examples. m represents an integer of 0 or more and 4 or less.

The compound having the structure represented by the general formula (1) is not limited to specific examples; the compounds represented by the following chemical structural formulae D-1 to D-21 may be used.

[Chem. 2]

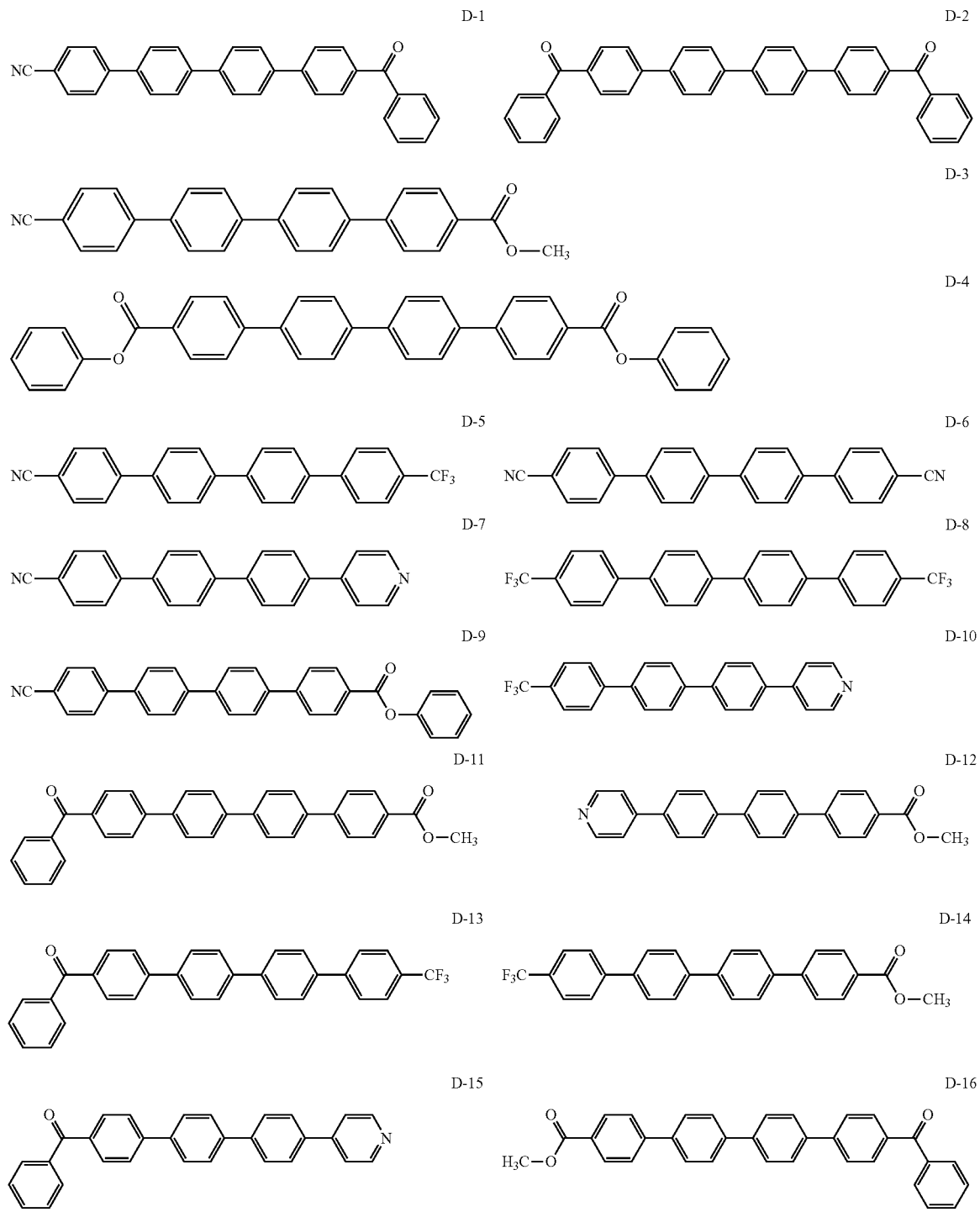

-continued

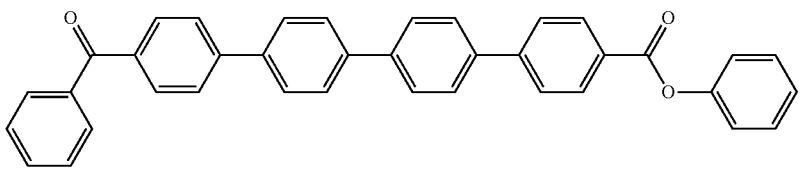

D-17

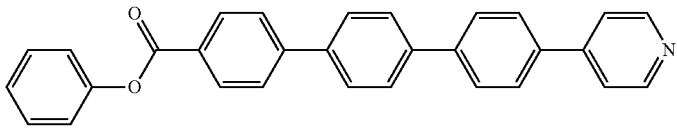

D-18

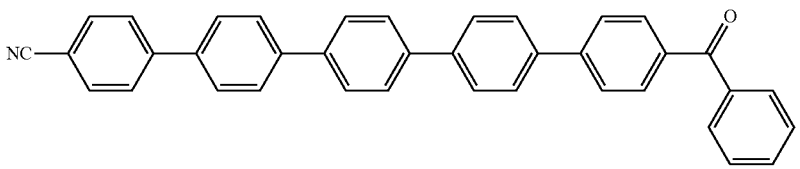

D-19

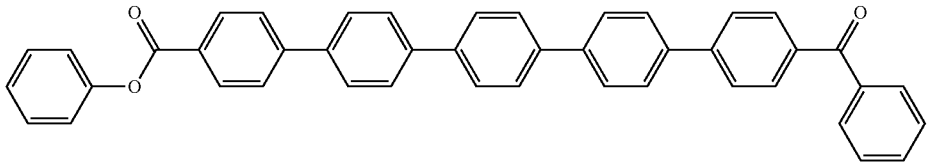

D-20

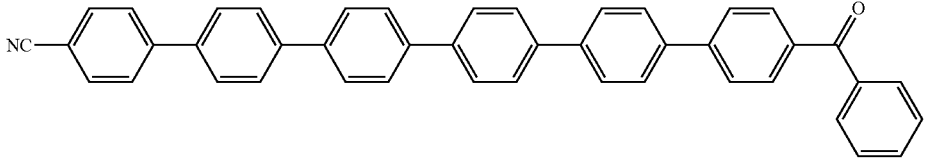

D-21

<Intermediate Layer>

The intermediate layer 15 is provided between the recording layers 14. In other words, the intermediate layers 15 (the pressure sensitive adhesive layers 15A and the recording layer support layers 15B) and the recording layers 14 are arranged alternately. In order to prevent crosstalk across a plurality of recording layers 14 (i.e., phenomenon in which a signal from one recording layer 14 is mixed with another signal from an adjacent recording layer 14), each intermediate layer 15 is provided to form a predetermined amount of space between the adjacent recording layers 14. For this purpose, the thickness of the intermediate layer 15 (the pressure sensitive adhesive layer 15A and the recording layer support layer 15B) is equal to or more than 3 μm.

The intermediate layer 15 is preferably as thin as possible as long as the inter-layer crosstalk can be prevented; in this embodiment, as an example, the pressure sensitive adhesive layer 15A and the recording layer support layer 15B are 10 μm thick, respectively. In other words, the pressure sensitive adhesive layer 15A and the recording layer support layer 15B in this embodiment have the same thickness. The pressure sensitive adhesive layers 15A and the recording layer support layers 15B thus formed with the same thickness makes the pitches provided between the reflective interfaces 18A not constant, i.e., 12 μm, 10 μm, 12 μm, 10 μm, . . . . Therefore, the influence of the interference which would occur during reading process between a read-back beam (that is a beam reflected off the target reflective interface 18A) and a reflected beam (that is a reading beam reflected off a reflective interface 18A adjacent to the target reflective interface 18A) can be reduced.

One of the pressure sensitive adhesive layer 15A and the recording layer support layer 15B is provided between two adjacent recording layers 14. The pressure sensitive adhesive layers 15A and the recording layer support layers 15B are alternately arranged with one recording layer 14 sandwiched between them. That is, as shown in FIG. 1, a set of layers consists of the pressure sensitive adhesive layer 15A, the recording layer 14, the recording layer support layer 15B and the recording layer 14 arranged in this order from a substrate 11 side, and this set of layers is provided repeatedly.

The pressure sensitive adhesive layers 15A and the recording layer support layers 15B are made of materials which are unreactive to irradiation with a laser beam applied during recording and read-back operation. Further, in order to minimize the loss of the recording beam, the reading beam, and the read-back beam, it is preferable that the pressure sensitive adhesive layers 15A and the recording layer support layers 15B are made of materials which substantially do not absorb (i.e., transparent to) the recording beam, the reading beam, and the read-back beam. Herein, the term "transparent" indicates that the absorption ratio thereof is equal to or less than 1%.

It is understood that the pressure sensitive adhesive layer 15A and the recording layer support layer 15B are layers each having a substantially uniformly distributed refractive index.

The pressure sensitive adhesive layer 15A and the recording layer support layer 15B have refractive indices different from each other. The recording layer support layer 15 and the recording layer 14 have substantially the same refractive index. To be more specific, the recording layer 14 and the recording layer support layer 15B have a comparable refractive index such that the following is satisfied:

$$((n3-n1)/(n3+n1))^2 \leq 0.0003$$

where n1 represents the refractive index of the recording layer 14, and n3 represents the refractive index of the recording layer support layer 15B; that is, the reflectivity at the non-reflective interface 18B is not more than 0.0003 (0.03%).

To prevent reflection at the interface between the recording layer 14 and the recording layer support layer 15B, it is preferable that the refractive indices of the recording layer 14 and the recording layer support layer 15B be as close as possible; the difference between the refractive indices of the recording layer 14 and the recording layer support layer 15B is preferably equal to or lower than 0.05, more preferably equal to or lower than 0.03, further preferably equal to or lower than 0.01, and most preferably 0. As one example, the refractive index n1 of the recording layer 14 is 1.565, and the refractive index n3 of the recording layer support layer 15B is 1.564. In this example, $((n3-n1)/(n3+n1))^2$ is substantially zero.

On the other hand, the pressure sensitive adhesive layer 15A and the recording layer 14 have different refractive indices. To be more specific, it is preferable that the difference between the refractive indices of the pressure sensitive adhesive layer 15A and the recording layer 14 is greater than the difference between the recording layer 14 and the recording layer support layer 15B and not greater than 0.11. To be more specific, the refractive indices of the recording layer 14 and the pressure sensitive adhesive layer 15A may preferably be different to such an extent that the following is satisfied:

$$0.0005 \leq ((n2-n1)/(n2+n1))^2 \leq 0.04$$

where n2 represents the refractive index of the pressure sensitive adhesive layer 15A.

If the reflectivity is equal to or greater than 0.0005, the quantity of reflected light derived from the reading beam reflected off the reflective interface 18A is large, so that a high signal-to-noise ratio is obtained in the process of reading the information. If the reflectivity at the reflective interface 18A is equal to or smaller than 0.04, the quantity of reflected light derived from the reading beam reflected off the reflective interface 18A is restricted to a moderate magnitude, so that the recording/read-back beam can reach deeper recording layers 14 without undergoing considerable attenuation in the recording and read-back processes. This makes it possible to increase the storage capacity by providing a large number of recording layers 14.

As an example, the refractive index n1 of the recording layer 14 is 1.565, and the refractive index n2 of the pressure sensitive adhesive layer 15A is 1.477. In this instance, $((n2-n1)/(n2+n1))^2$ is 0.0008 (0.08%).

In this embodiment, the pressure sensitive adhesive layer 15A has an adhesive property with which it can be stuck on another surface, and is softer than the recording layer 14. To be more specific, for example, the glass transition temperature of the pressure sensitive adhesive layer 15A is lower than that of the recording layer 14. These configurations can be obtained by appropriately selecting a polymer binder to (resin) usable as a material for the recording layer 14 and a resin usable as a material for the pressure sensitive adhesive layer 15A.

According to the above-described configuration in which the pressure sensitive adhesive layer 15A is softer than the recording layer 14, the pressure sensitive adhesive layer 15A is easily deformable by thermal expansion of the recording layer 14 caused by heating with the recording beam so that deformation of the reflective interface 18A can be caused to occur with increased ease.

If a material for the recording layer 14 is applied to the pressure sensitive adhesive layer 15A to provide the recording layer 14 on the pressure sensitive adhesive layer 15A, the pressure sensitive adhesive layer 15A would be affected by the material for the recording layer 14, depending upon the properties of the material for the pressure sensitive adhesive layer 15A. With this in view, the recording layer support layer 15B is formed of a material which is unaffected by the material for the recording layer 14, so that the recording layer 14 can be formed on the recording layer support layer 15B. The material for the recording layer support layer 15B is preferably selected from those which are solvent resistant, for example, those which have a high degree of crosslinking.

The material for the recording layer support layer 15B may preferably be a thermoplastic or energy curable type resin which has a higher hardness, i.e., a higher glass transition temperature, in comparison with that of the pressure sensitive adhesive layer 15A. In a case where an energy curable type resin is used, manufacture of a multilayer structure sheet as will be described later can be performed easily because this material can be applied to an appropriate thickness and can be cured swiftly. Further, in a case where an energy curable type resin is used, it is preferable that an ultraviolet curable resin is adopted. By adopting this configuration in which the recording layer support layer 15B is formed of an ultraviolet curable resin, the recording layer support layer 15B can be cured easily by application of easy-to-handle ultraviolet rays; thus, this configuration is advantageous for manufacture of a large-area multilayer structure sheet.

In this embodiment, the recording layer support layer 15B may have a hardness equal to or higher than the recording layer 14. To be more specific, for example, the recording layer support layer 15B may be formed such that a glass transition temperature thereof is equal to or higher than the glass transition temperature of the recording layer 14. This configuration can be achieved by appropriately selecting a resin usable as the material for the recording layer 14 and a resin usable as the material for the recording layer support layer 15B.

In order to make the difference between the refractive index n1 of the recording layer 14 and the refractive index n3 of the recording layer support layer 15B smaller and preferably to 0, the composition of the material for use in the recording layer 14 and the composition of the material for use in the recording layer support layer 15B can be adjusted. To be more specific, since the material for the recording layer 14 is prepared by mixing a dye such as a two-photon absorption compound in the polymer binder, the refractive index n1 of the recording layer 14 can be adjusted as desired by appropriately selecting the dye or the polymer binder having an appropriate refractive index and changing their respective composition ratios. The refractive index of the polymer binder varies depending on the degree of polymerization even if they have similar basic constitution. Therefore, the refractive index n1 can also be adjusted by using polymer binders with different degrees of polymerization or by adjusting the degree of polymerization of the polymer binder. Further, the refractive index n1 can be adjusted by mixing different kinds of polymer binders. Further, a refractive index matching material (inorganic particulate and the like) may be added to adjust the refractive index n1.

To adjust the refractive index n3 of the recording layer support layer 15B, the degree of polymerization of the polymer material such as a resin usable as the material for the recording layer support layer 15B may be adjusted. As an alternative, a material usable for the intermediate layer 15 may be optionally added to adjust the refractive index n3, or the adjustment can also be made by adding a refractive index matching material (inorganic particulate and the like).

<Cover Layer>

The cover layer 16 is a layer provided to protect the recording layers 14 and the intermediate layers 15 (pressure sensitive adhesive layers 15A and recording layer support layers 15B). The cover layer 16 is made of a material which allows the recording/read-back beam to pass through the cover layer 16. The cover layer 16 has an appropriate thickness in the range from several tens micro meters to several millimeters.

<Recording and Reading Back of Information>

A method for recording and reading information in the optical information recording medium 10 as described above will be described hereafter.

To record information in a desired recording layer 14, as seen in FIG. 1, the recording layer 14 is irradiated with a laser beam (recording beam RB) the output of which is modulated in accordance with the information to be recorded. The wavelength of this laser beam is 405 nm by way of example. If the recording layer 14 contains a multi-photon absorption compound as a recording dye, it is preferable that the laser beam used for this recording may be a pulsed laser beam, the peak power of which can be increased. Although a focal position of the recording beam RB is not limited to a specific position, the recording beam RB may be focused on or around the reflective interface 18A. It is preferable that the focal position be adjusted by first focusing on the reflective interface 18A and then slightly shifting the focal position toward the recording layer 14.

Figure 2:
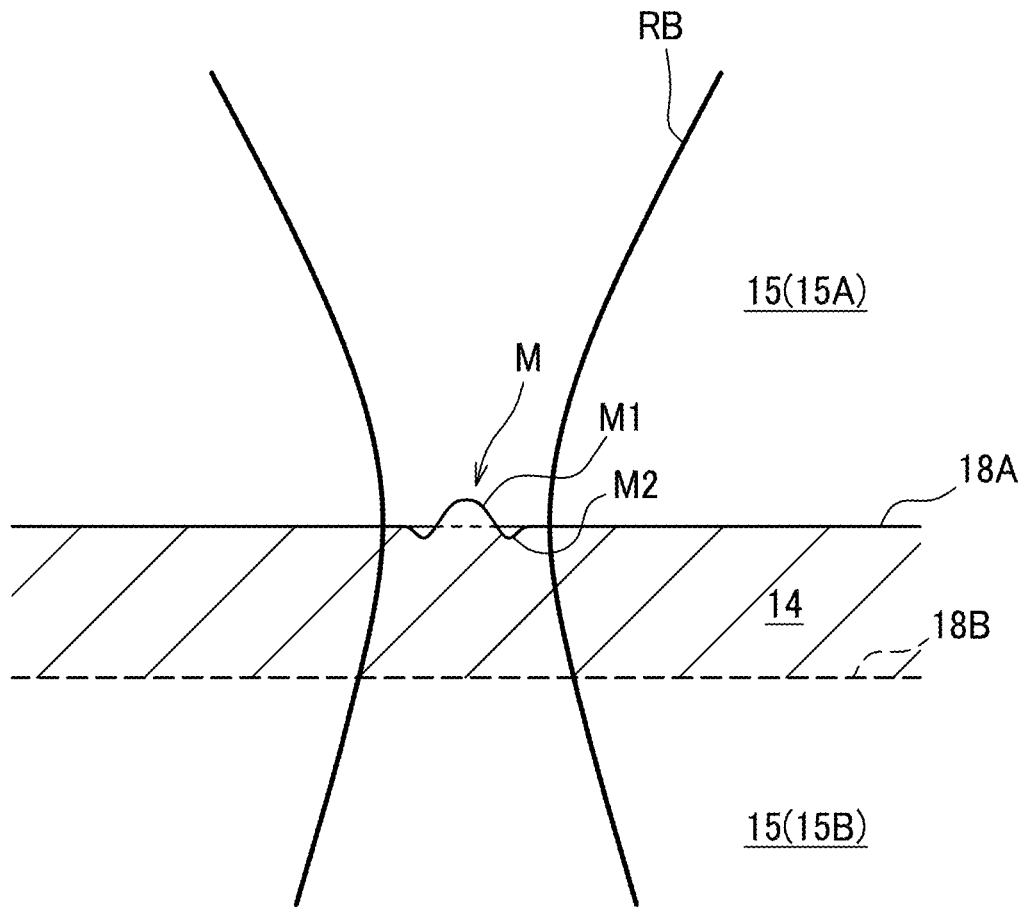
FIG. 2 is a diagram showing a recording spot formed at the time of recording information.
Figure 3:
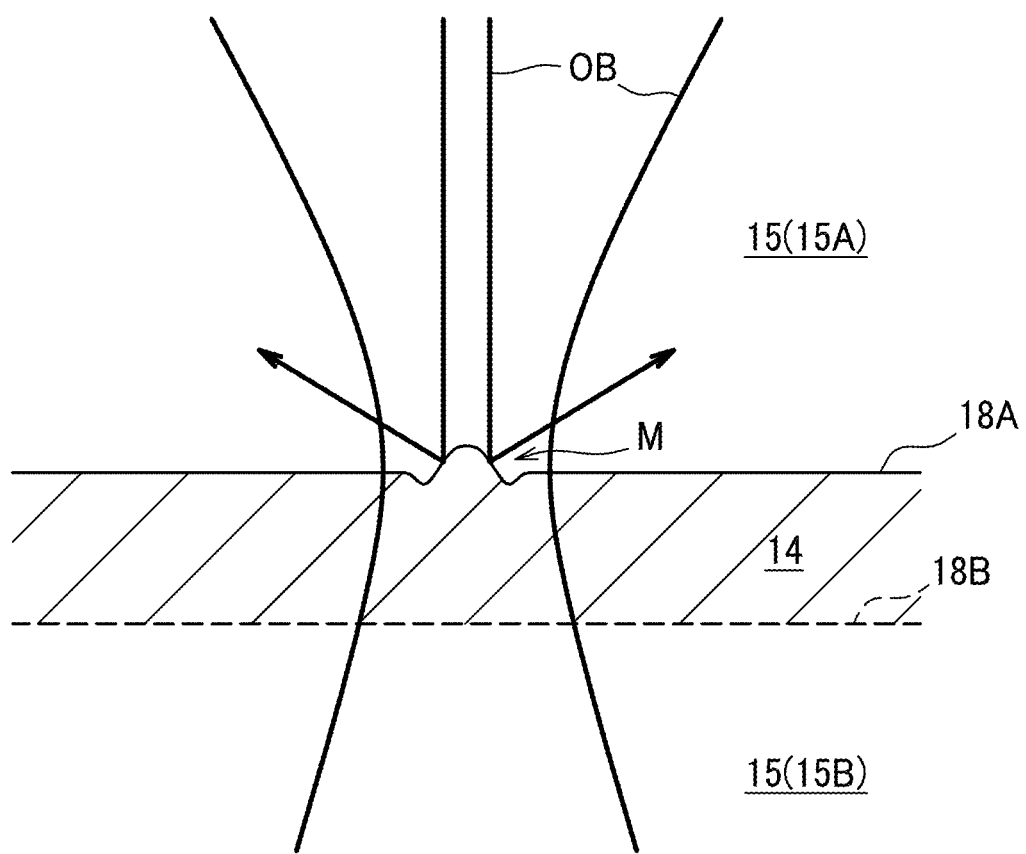
FIG. 3 is a diagram for explaining the process of reading information.

When a recording beam RB is applied, a center of an area on which the recording beam RB is applied takes a protrusive shape protruding from the recording layer 14 into the pressure sensitive adhesive layer 15A and forms a recording spot M. More specifically, as shown in FIG. 2, this recording spot M includes a center portion which forms a protrusion M1, and an annular recessed portion M2 which surrounds the protrusion M1 and is recessed into the recording layer 14. The distance from the reflective interface 18A (the reflective interface 18A before undergoing a change in shape) to the deepest portion of the recessed portion M2 is smaller than the distance from the reflective interface 18A (the reflective interface 18A before undergoing a change in shape) to the peak of the protrusion M1. In other words, the recording spot M as seen with attention focused on the recording layer 14 can be considered to assume a generally protrusive shape as a whole. Although the principle of formation of the recording spot M having a protrusively shaped center portion has not been fully elucidated, one assumption as will be described below can be made on the analogy of the hitherto known principle of formation of a recessed shape in the recording scheme by which a center of an area on which the recording beam is applied takes a recessed shape (this principle is also explained based on an assumption).

First, an overview of the conventional recording scheme is summarized with reference to J. Appl. Phys. 62 (3), 1 Aug. 1987 as follows: when a recording beam RB is applied to a recording material, the temperature of the recording material is caused to increase and the recording material (recording layer 14) expands as shown in FIG. 4(a) (the hatched area shows a heated region); then, as shown in FIG. 4(b) a portion that has been expanding flows out onto the surrounding area under surface tension; thereafter, as the temperature lowers, the recording material that has expanded contracts and a portion that has flowed out on the surrounding area is left at a level higher than the reference surface (on the upper surface of the recording layer 14) to form a protrusion but a center portion lowers to a level lower than the reference surface as a result of the outflow of the material to form a recessed portion, as shown in FIG. 4(c).

Figure 4:
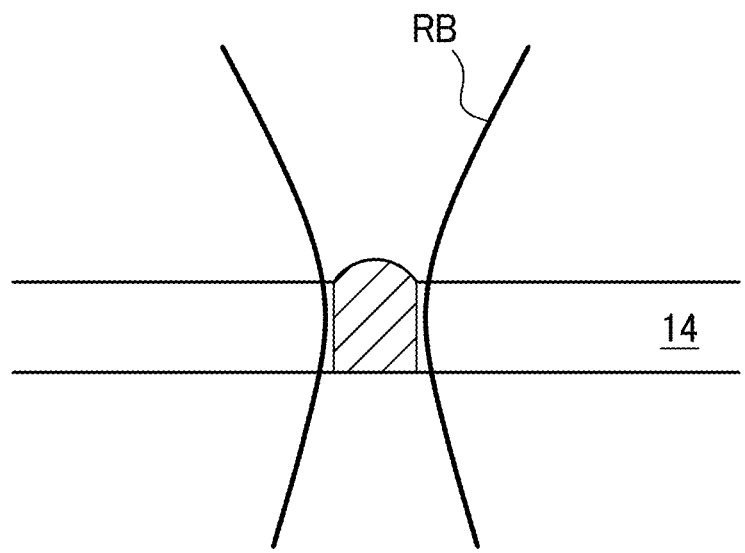
FIG. 4 is a diagram for explaining the process of forming a recessed shape in a recording layer.
Figure 4:
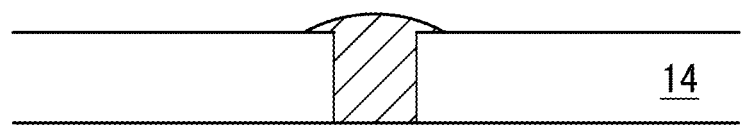
Figure 4:
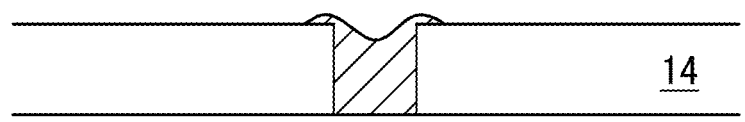

In contrast, in the optical information recording medium 10 configured according to this embodiment, when a recording beam RB is applied to a recording material, the recording layer thermally expands, and the recording layer 14 bulges as shown in FIG. 4(a), in a manner similar to the conventional scheme. However, in this embodiment, the viscosity of a portion of the recording layer 14 near its surface will not lower to a level as in the conventional scheme because the recording layer 14 is relatively thicker or for other reasons, and thus the outflow as shown in FIG. 4(b) will not occur. Therefore, when the portion which has expanded contracts with decreasing temperature, that portion deforms from the shape shown in FIG. 4(a) to the shape shown in FIG. 2 such that a protrusion M1 is left at the center and a recessed portion M2 is formed around the protrusion M1.

The recording spot M formed as described above can be detected by irradiation with the reading beam OB produced by a continuous-wave laser, because a difference in light intensity between the light reflected off the portion surrounding the recording spot M in the reflective interface 18A and the light reflected off the recording spot M, as resulting from a difference between the refractive index n1 of the recording layer 14 and the refractive index n2 of the pressure sensitive adhesive layer 15A, is observed so that the observed modulation of the light intensity makes the recording spot M detectable. To enable such optical detection, it is considered to be preferable that the protrusion M1 protrudes beyond a position of the interface (reflective interface 18A) before undergoing a change in shape to such an extent that ranges from 1 to 300 nm or so.

It is to be understood that the recording spot formed in the optical information recording medium 10 may, as the case may be, only have a protruding shape with no recessed shape formed around the protruding shape, depending on the recording conditions.

In this embodiment, the recording spot M has a recessed portion M2 formed around the protrusion M1, and thus distribution of the intensity of light reflected off a recording spot M when a reading beam OB for detecting a recording spot M is applied to the recording spot M is expected to change steeply (more steeply than the case where only a protrusion M1 is formed) according to the distance from the center of the protrusion M1, with the result that a read-back signal with a higher degree of modulation can be obtained.

The present invention is not construed to be limited only to the method in which information is recorded by causing a recording layer 14 to be deformed into a protruding shape, but understood to encompass such a method as conventionally proposed in which information is recorded through deformation into a recessed shape. It is also to be understood that a non-reflective interface 18B as shown in FIG. 1 may also be subject to deformation during recording in the optical information recording medium 10; however, such deformation would not affect reading because reflection of reading beam OB does not occur at the non-reflective interface 18B.

To erase the information recorded in the recording layer 14, the recording layer 14 is heated to a temperature around the glass transition temperature of the polymer binder, preferably to a temperature higher than the glass transition temperature, so that the fluidity of the polymer binder is increased and the deformation in the reflective interface 18A disappears due to surface tension to thereby return to its original plane shape; as a result, the information recorded in the recording layer 14 can be erased. Because the information is erasable, re-recording in the recording layer 14 (repeated recording) is possible. When the recording layer 14 is heated for that purpose, the recording layer 14 may be irradiated with a continuous-wave laser beam while focusing the laser beam on the recording layer 14. Through heating with a continuous-wave laser beam, the information recorded in a continuous region within the recording layer 14 can be erased completely without omission. The continuous-wave laser used may be a laser used for reading back the information, or alternatively, another laser may be used. In either case, it is preferable that a laser which emits light having a wavelength absorbable by a one-photon absorption dye is used.

Further, when information is to be erased by heating the recording layer 14, the optical information recording medium 10 may be heated as a whole to a temperature higher than the glass transition temperature of the polymer binder so that the information recorded in all the recording layers 14 can be erased at once. With this method, irrespective of the kind of dyes contained in the recording layer 14, all the information recorded in the optical information recording medium 10 can be erased easily for initialization. Moreover, when the optical information recording medium 10 is to be disposed of, the information can be easily erased.

As described above, with the optical information recording medium 10 according to this embodiment, while it can be manufactured by using multilayer structure sheets as will be described later, only two kinds of interfaces are provided therein, which include an interface (reflective interface 18A) between the pressure sensitive adhesive layer 15A and the recording layer 14, and an interface (non-reflective interface 18B) between the recording layer 14 and the recording layer support layer 15B, so that improved flexibility is offered in selection of materials for respective layers in comparison with another configuration in which three or more kinds of interfaces are provided.

Although the optical information recording medium 10 according to the present embodiment has been described above, the optical information recording medium may be implemented in an appropriately modified form without limitation to the above-described embodiment. For example, in the above-described embodiment, the thickness of the recording layer 14 is defined as being 50 nm or greater, but the thickness less than 50 nm may also work as well. Furthermore, the above-described embodiment is exemplified such that both of the one-photon absorption dye and the multi-photon absorption dye can be used, but only a specific one-photon absorption dye or multi-photon (e.g., two-photon) absorption dye may be selected for use therein.

In the above-described embodiment, the recording layer 14 is configured to include a polymer binder and a dye dispersed in the polymer binder, but the present invention is not limited to this configuration; the recording layer may be configured to include a polymer to which a dye is bonded To be more specific, the recording layer 14 may contain a polymer having a structure represented by the following general formula (2).

[Chem. 3]

General Formula (2)

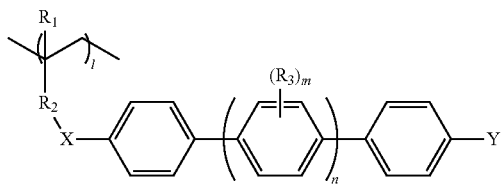

In the general formula (2), Y represents a substituent having a Hammett's sigma-para value (σp value) of 0 or more, X also represents the same kind of substituent. X and Y may be the same as or different from each other. n represents an integer of 1 to 4; $R_1$, $R_2$, $R_3$ represent substituents, which may be the same as or different from each other; l represents an integer not less than one; and m represents an integer of 0 to 4.

Figure 5:
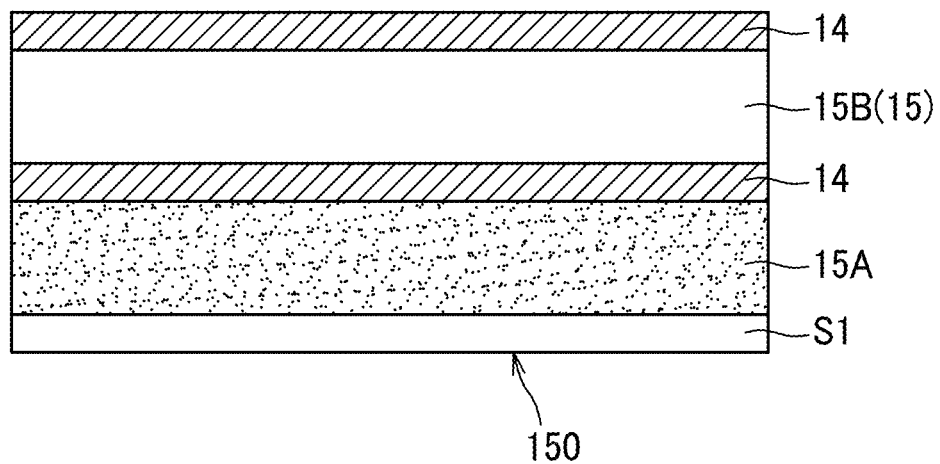
FIG. 5 is a sectional view of a multilayer structure sheet.

The optical information recording medium 10 configured as described above may be manufactured by using a multilayer structure sheet 150 as shown in FIG. 5.

<Multilayer Structure Sheet>

The multilayer structure sheet 150 includes a first release sheet (release sheet) S1, a pressure sensitive adhesive layer 15A, recording layers 14 and a recording layer support layer 15B. To be more specific, the multilayer structure sheet 150 in which the pressure sensitive adhesive layer 15A, the recording layer 14, the recording layer support layer 15B and the recording layer 14 stacked in this order is provided on a surface of the first release sheet S1 on which a releasing agent is applied. In other words, the multilayer structure sheet 150 comprises one unit structure configured such that a pressure sensitive adhesive layer 15A, a recording layer 14, a recording layer support layer 15B and a recording layer 14 are stacked in this order, and a release sheet (first release sheet S1) is attached to the outer surface of the pressure sensitive adhesive layer 15A disposed furthest outside.

As described above, in the multilayer structure sheet 150 according to the present embodiment, only two kinds of interfaces are provided which include an interface between the pressure sensitive adhesive layer 15A and the recording layer 14, and an interface between the recording layer 14 and the recording layer support layer 15B, and thus, improved flexibility is offered in selection of materials for respective layers in comparison with another configuration in which three or more kinds of interfaces are provided.

Furthermore, since the multilayer structure sheet 150 according to the present embodiment is configured such that the release film is not directly attached to any recording layer 14, cracking which would occur in the recording layer when the release film is peeled off can be prevented.

<Method for Manufacturing a Multilayer Structure Sheet>

The multilayer structure sheet 150 configured as described above can be manufactured by the following method.

Figure 6:
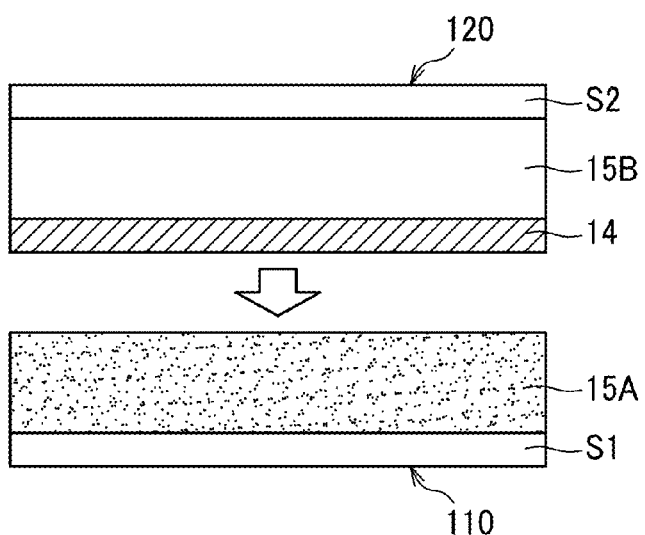
FIG. 6 is a diagram for explaining a method for manufacturing a multilayer structure sheet.
Figure 6:
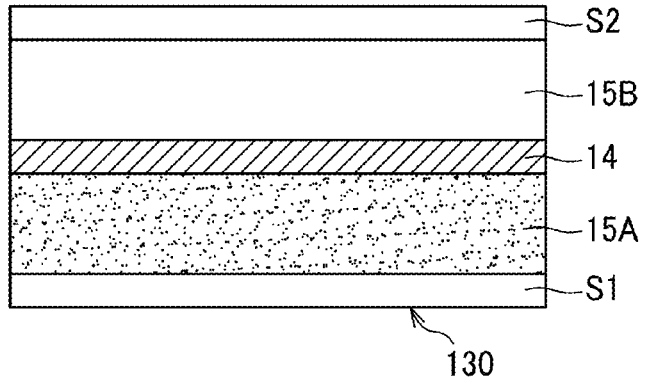
Figure 6:
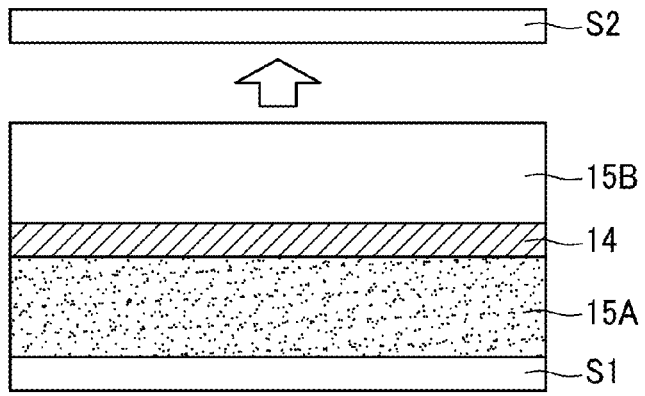

First of all, as shown in FIG. 6(*a*), a pressure sensitive adhesive layer 15 A is formed on a surface of a first release sheet S1 on which a releasing agent is applied, to obtain a first sheet 110 (first step). On the other hand, a recording layer support layer 15B is formed on a surface of a second release sheet S2 on which a releasing agent is applied, which second release sheet S2 is a release sheet prepared separately from the first release sheet S1 (second step), and a recording layer 14 is formed on the recording layer support layer 15B, to form a second sheet 120 (third step). The releasing agent applied to the second release sheet S2 used herein has a higher-grade releasing property such that a force required for peeling off the second release sheet S2 is weaker than a force required for peeling off the first release sheet S1. It is to be understood that the first, second and third steps may be performed in any order.

The method for forming the respective layers may be selected without limitation; for example, knife coating, roll coating, bar coating, blade coating, die coating, gravure coating and any other coating methods may be adopted.

Next, the pressure sensitive adhesive layer 15A of the first sheet 110 and the recording layer 14 of the second sheet 120 are laminated together, thereby stacking the second sheet 120 on the first sheet 110, to obtain a third sheet 130, as shown in FIG. 6(*b*) (fourth step). With this process steps, the recording layer 14 is not directly attached to either of the first release sheet S1 and the second release sheet S2, and sandwiched by the pressure sensitive adhesive sheet 15A and the recording layer support layer 15B; therefore, cracking which would occur in the recording layer 14 when the first release film S1 and the second release film S2 are peeled off can be prevented.

Then, as shown in FIG. 6(c), the second release sheet S2 is removed from the third sheet 130 to expose the recording layer support layer 15B (fifth step). Since the second release sheet S2 peels more easily than the first release sheet S1 as described above, the first release sheet S1 does not peel and the second release sheet S2 only can be removed in the fifth step.

Next, as shown in FIG. 5, a recording layer 14 is formed on the recording layer support layer 15B exposed in the fifth step to obtain a multilayer structure sheet (fourth sheet) 150 (sixth step). The method for forming the recording layer 14 may be the same method as the method for forming the respective layers in the third step, or any different method.

The multilayer structure sheet 150 obtained as described above is rolled up into a roll which is put into storage, and only a necessary length of which is dispensed therefrom when used. When the multilayer structure sheet 150 is rolled up, the uppermost recording layer 14 arranged at its top comes in contact with the first release sheet S1. However, as the first release sheet S1 never sticks to a dry recording layer 14 (it is not adhering thereto but only in touch therewith), cracking would not occur in the recording layer 14 when the multilayer structure sheet 150 is dispensed.

With the method for manufacturing a multilayer structure sheet 150 according to the present embodiment as described above, the process of manufacture resultantly provides only two kinds of interfaces which include an interface between the pressure sensitive adhesive layer 15A and the recording layer 14, and an interface between the recording layer 14 and the recording layer support layer 15B, and thus, improved flexibility is offered in selection of materials for respective layers in comparison with another configuration in which three or more kinds of interfaces are provided.

<Method for Manufacturing an Optical Information Recording Medium>

Next, two methods for manufacturing an optical information recording medium 10 according to the present embodiment using a multilayer structure sheet 150 will be described. The first method is a method in which multilayer structure sheets 150 are laminated on the substrate 11 one after another.

Figure 7:
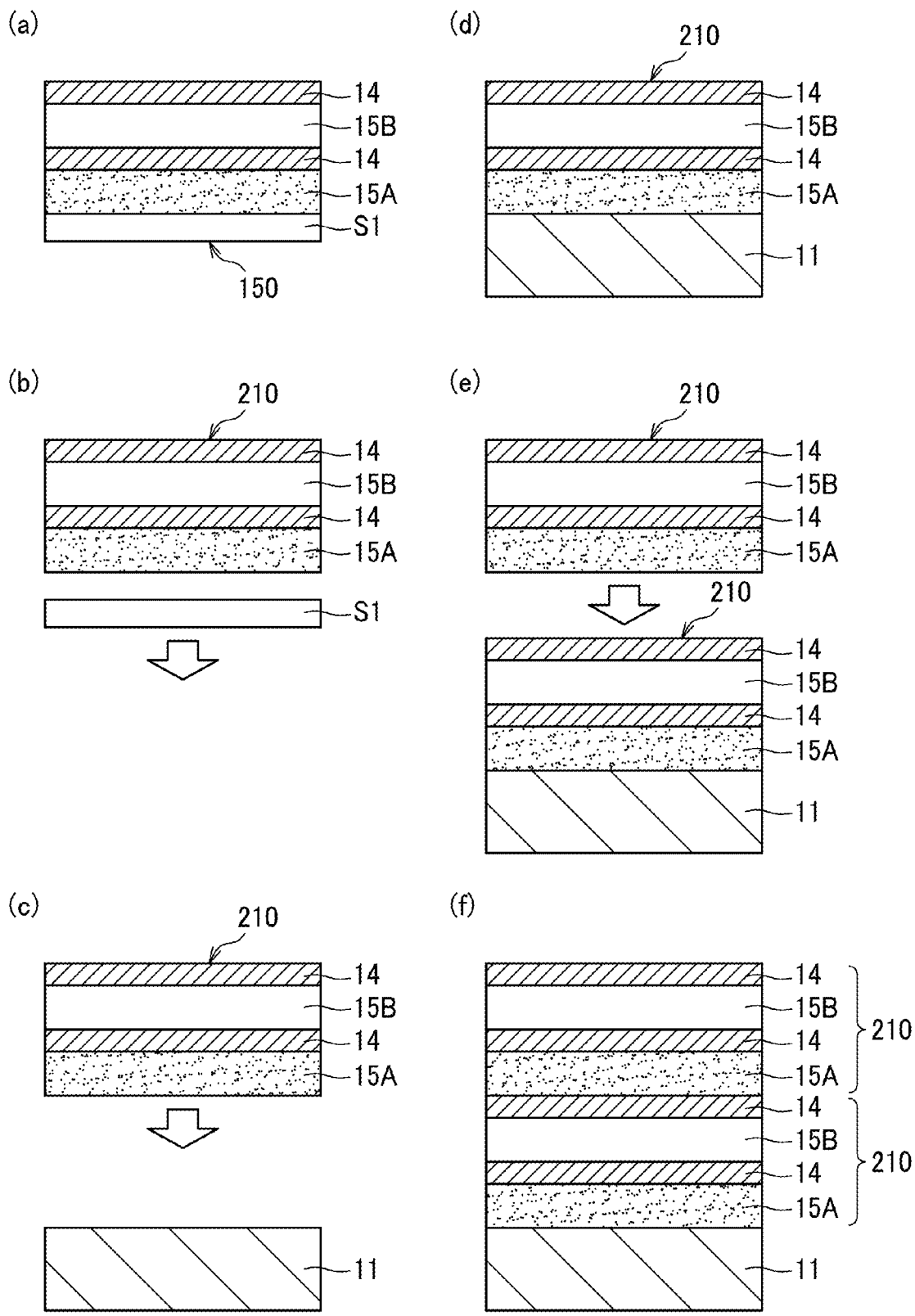
FIG. 7 is a diagram for explaining a method for manufacturing a multilayer optical information recording medium using a multilayer structure sheet.

To be more specific, the multilayer structure sheet 150 shown in FIG. 7(a) rolled up in a roll is dispensed, and stamped into the shape of the substrate 11, to obtain a plurality of multilayer structure sheets 150 (preliminary step). As shown in FIG. 7(b), the first release sheet S1 is removed from one of the plurality of stamped-out multilayer structure sheets 150, to obtain a first multilayer structure sheet 210 having an exposed pressure sensitive adhesive layer 15A (release step).

Next, as shown in FIG. 7(c), the exposed pressure sensitive adhesive layer 15A of the first multilayer structure sheet 210 is stuck to the substrate 11 and thus the first multilayer structure sheet 210 is stacked on the substrate 11 (sticking step). In this way, one unit structure is formed on the substrate 11 as shown in FIG. 7(d).

Then, as shown in FIG. 7(e), the pressure sensitive adhesive layer 15A of another first multilayer structure sheet 210 is stuck to the uppermost recording layer 14 of the first multilayer structure sheet 210 stuck to the substrate 11, and thus that another first multilayer structure sheet 210 is stacked on the first multilayer structure sheet 210 stuck to the substrate 11 (first laminating step). In this way, a structure in which two unit structures are stacked on the substrate 11 is formed as shown in FIG. 7(f). Further, the step of stacking an additional first multilayer structure sheet 210 on the uppermost recording layer 14 provided on the substrate 11 is repeatedly performed.

Lastly, a cover layer 16 is formed on the uppermost recording layer 14, and an optical information recording medium 10 having a multilayer structure with a plurality of recording layers 14 can be manufactured as shown in FIG. 1.

Next another example of the method for manufacturing an optical information recording medium 10 will be described below. This alternative manufacturing method is such that a previously provided structure (multilayer structure sheet) in which a plurality of multilayer structure sheets 150 are stacked on one other multilayer structure sheet 150 is stuck to a substrate 11.

Figure 8:
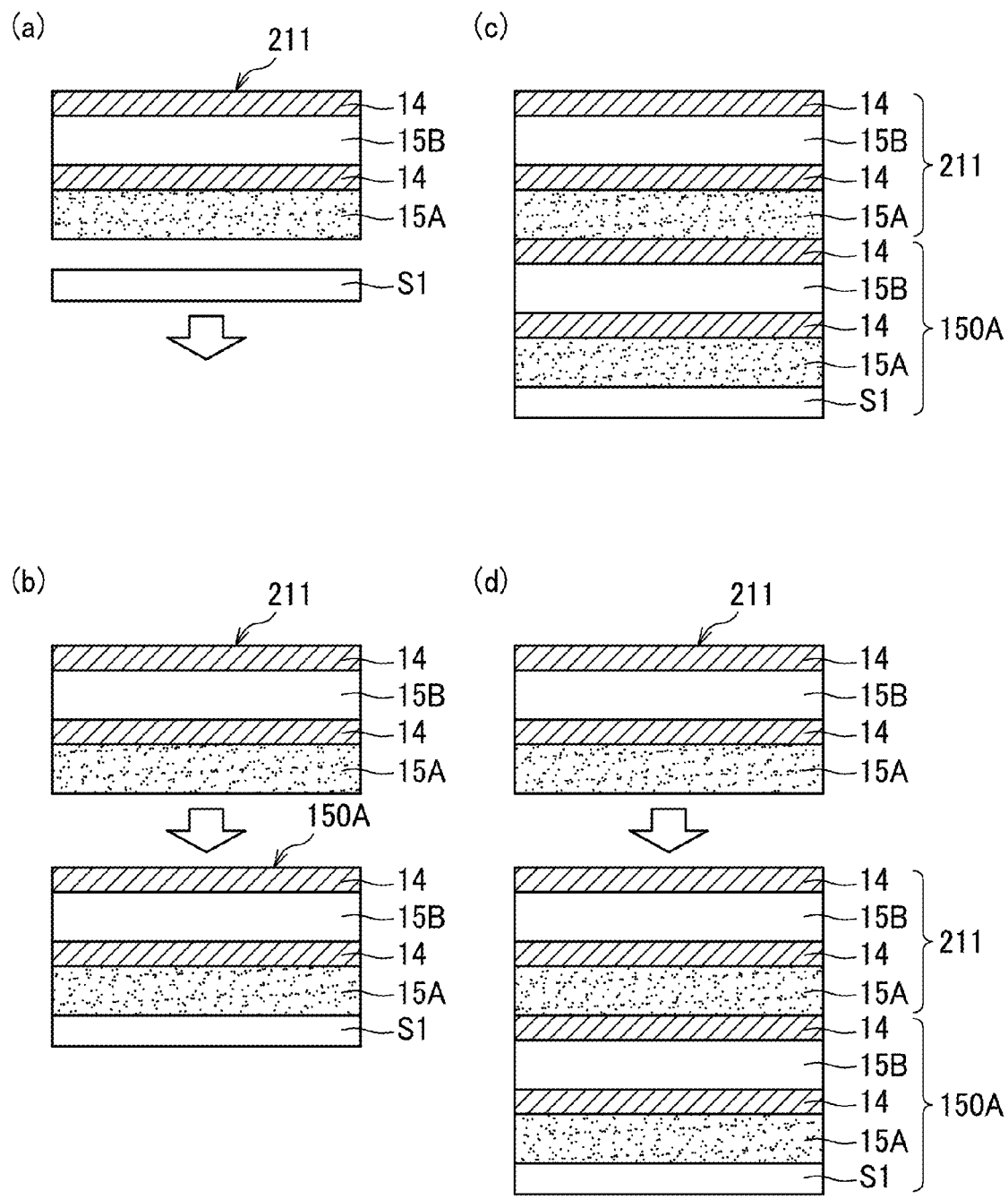
FIG. 8 is a diagram for explaining a preliminary step, a release step, and a second laminating step in another example of the method for manufacturing a multilayer optical information recording medium.

To be more specific, first, a plurality of multilayer structure sheets 150 (fourth sheet shown in FIG. 5) are prepared (preliminary step), one of which is picked up as a second multilayer structure sheet 150A (see FIG. 8(b)).

As shown in FIG. 8(a), the first release sheet S1 is removed from a multilayer structure sheet 150 other than the second multilayer structure sheet 150A in the plurality of multilayer structure sheets 150, to obtain a third multilayer structure sheet (fifth sheet) 211 having an exposed pressure sensitive adhesive layer 15A (release step (seventh step)).

Next, as shown in FIG. 8(b), the exposed pressure sensitive adhesive layer 15A of the third multilayer structure sheet 211 is stuck to the uppermost recording layer 14 of the second multilayer structure sheet 150A, and thus the third multilayer structure sheet 211 is stacked on the second multilayer structure sheet 150A (second laminating step (eighth step)). In this way, a structure in which two unit structures are stacked on the first release sheet S1 is obtained as shown in FIG. 8(c).

Then, as shown in FIG. 8(d), the exposed pressure sensitive adhesive layer 15A of another third multilayer structure sheet 211 is stuck to the uppermost recording layer 14 of the third multilayer structure sheet 211 stuck to the second multilayer structure sheet 150A in the second laminating step, and thus that another third multilayer structure sheet 211 is stacked on the third multilayer structure sheet 211 stuck to the second multilayer structure sheet 150A. In this way, two third multilayer structure sheets 211 are stacked and stuck to the second multilayer structure sheet 150A, and a fourth multilayer structure sheet 220 (multilayer structure sheet) having a structure in which unit structures are stacked repeatedly on the first release sheet S1 is obtained as shown in FIG. 9(a). It is to be understood that the fourth multilayer structure sheet 220 may have a structure such that three or more third multilayer structure sheets are stuck which structure may be obtained by repeating the release step and the second laminating step twice or more times.

This fourth multilayer structure sheet 220 is prepared before a sticking step which will be described later, and rolled up into a roll for storage. When it is used, the fourth multilayer structure sheet 220 rolled up in a roll is dispensed, and stamped into the shape of the substrate 11.

Figure 9:
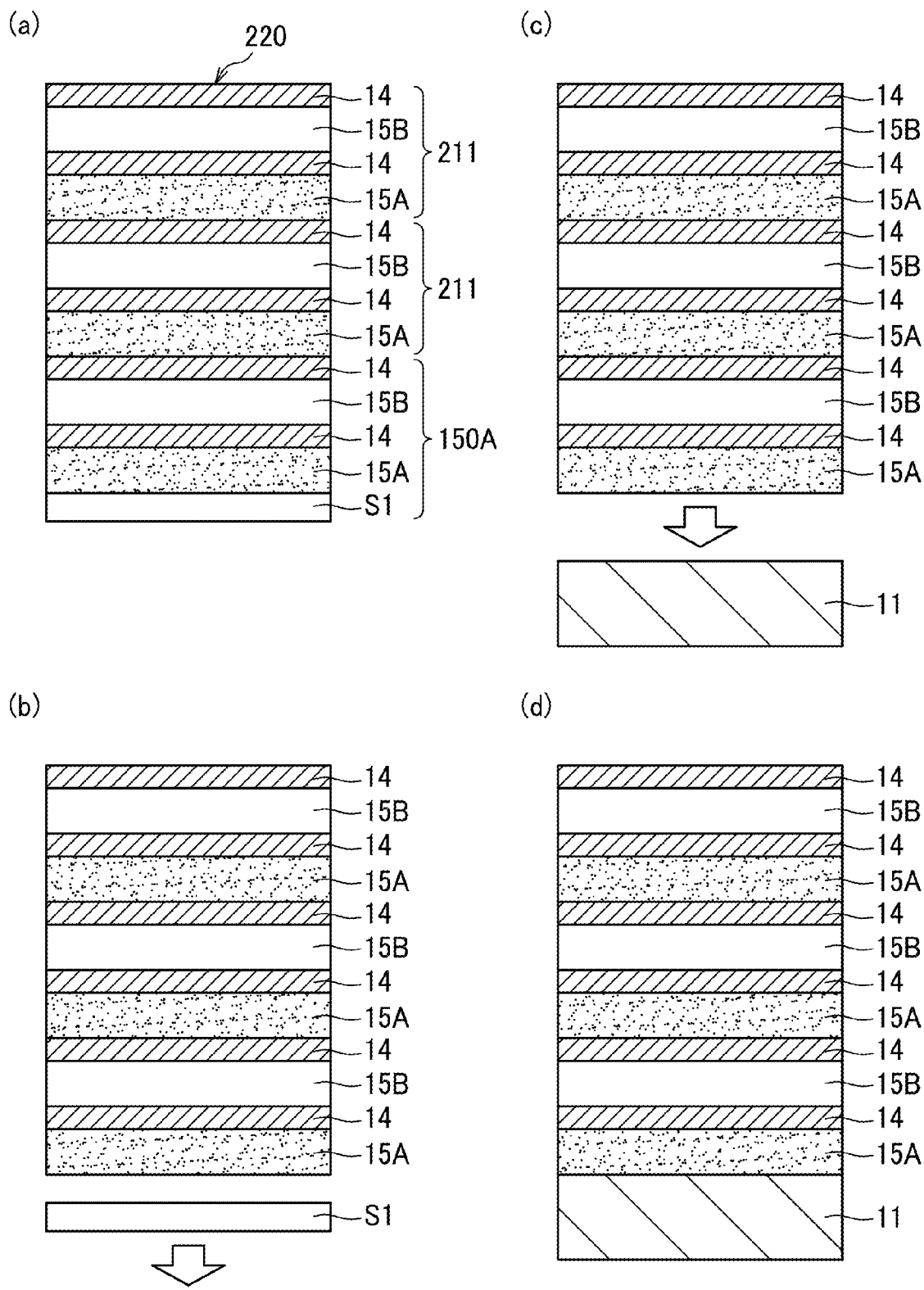
FIG. 9 is a diagram for explaining a sticking step in the another example of the method for manufacturing a multilayer optical information recording medium.

Next, as shown in FIG. 9 (b), the first release sheet S1 is removed from the fourth multilayer structure sheet 220 stamped out in the shape of the substrate 11. As shown in FIG. 9(c), the pressure sensitive adhesive layer 15A exposed by removing the release sheet S1 is stuck to a substrate 11, to stack the fourth multilayer structure sheet 220 on the substrate 11 (sticking step). In this way, a structure in which unit structures are repeatedly stacked on the substrate 11 is formed as shown in FIG. 9(d).

Lastly, a cover layer 16 is formed on the uppermost recording layer, so that an optical information recording medium 10 having a multilayer structure with a plurality of recording layers 14 as shown in FIG. 1 can be manufactured.

With the method for manufacturing an optical information recording medium 10 according to the present embodiment as described above, each interface between the layers formed in the manufacturing process has only two kinds which include an interface between the pressure sensitive adhesive layer 15A and the recording layer 14, and an interface between the recording layer 14 and the recording layer support layer 15B; therefore, improved flexibility is offered in selection of materials for respective layers in comparison with another configuration in which three or more kinds of interfaces are present.

Moreover, since the method for manufacturing an optical information recording medium 10 according to the present embodiment is configured to use a multilayer structure sheet 150, a large-area optical information recording medium 10 can be manufactured with increased ease and thus improved productivity in comparison with a method for manufacturing an optical information recording medium 10 by adopting a spin coating method.

Figure 10:
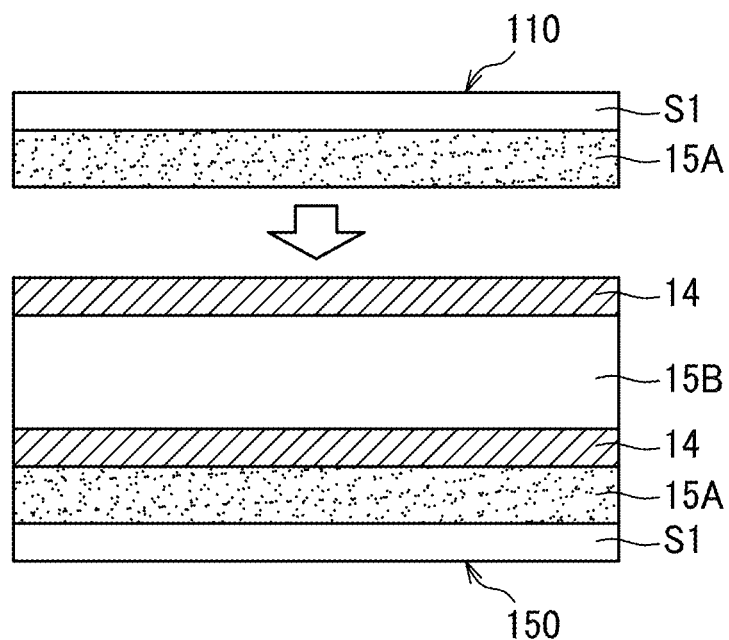
FIG. 10 is a diagram for explaining a method for manufacturing a multilayer structure sheet according to a modified example.
Figure 10:
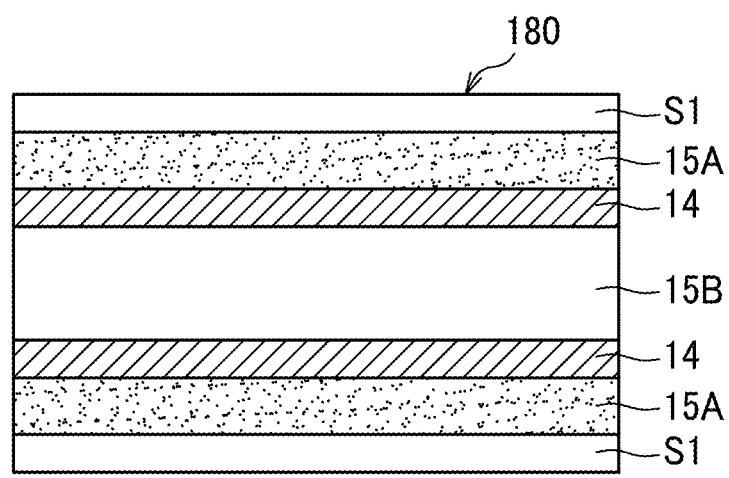

In the above-described embodiment, the multilayer structure sheet 150 is configured to provide a recording layer 14 at its uppermost layer (outermost layer), but the present invention is not limited to this configuration. For example, the uppermost layer of the multilayer structure sheet may be a pressure sensitive adhesive layer 15A to which a release sheet is attached. To be more specific, a multilayer structure sheet 180 having one unit structure can be obtained by, as shown in FIG. 10(a), laminating a recording layer 14 arranged at the uppermost layer of the multilayer structure sheet 150 in the above-described embodiment and a pressure sensitive adhesive layer 15A of a first sheet 110 as manufactured in the first step of FIG. 6(a). It is to be understood that the thickness of the pressure sensitive adhesive layer 15A in this modified example is preferably half the thickness of the recording layer support layer 15B. With this configuration in which the thickness of the pressure sensitive adhesive layer 15A is half the thickness of the recording layer support layer 15B, the thickness of the pressure sensitive adhesive layers 15 laminated together as will be described later will become the same thickness as that of the recording layer support layer 15B.

Next, a method for manufacturing an optical information recording medium 10 using this multilayer structure sheet 180 will be described.

Figure 11:
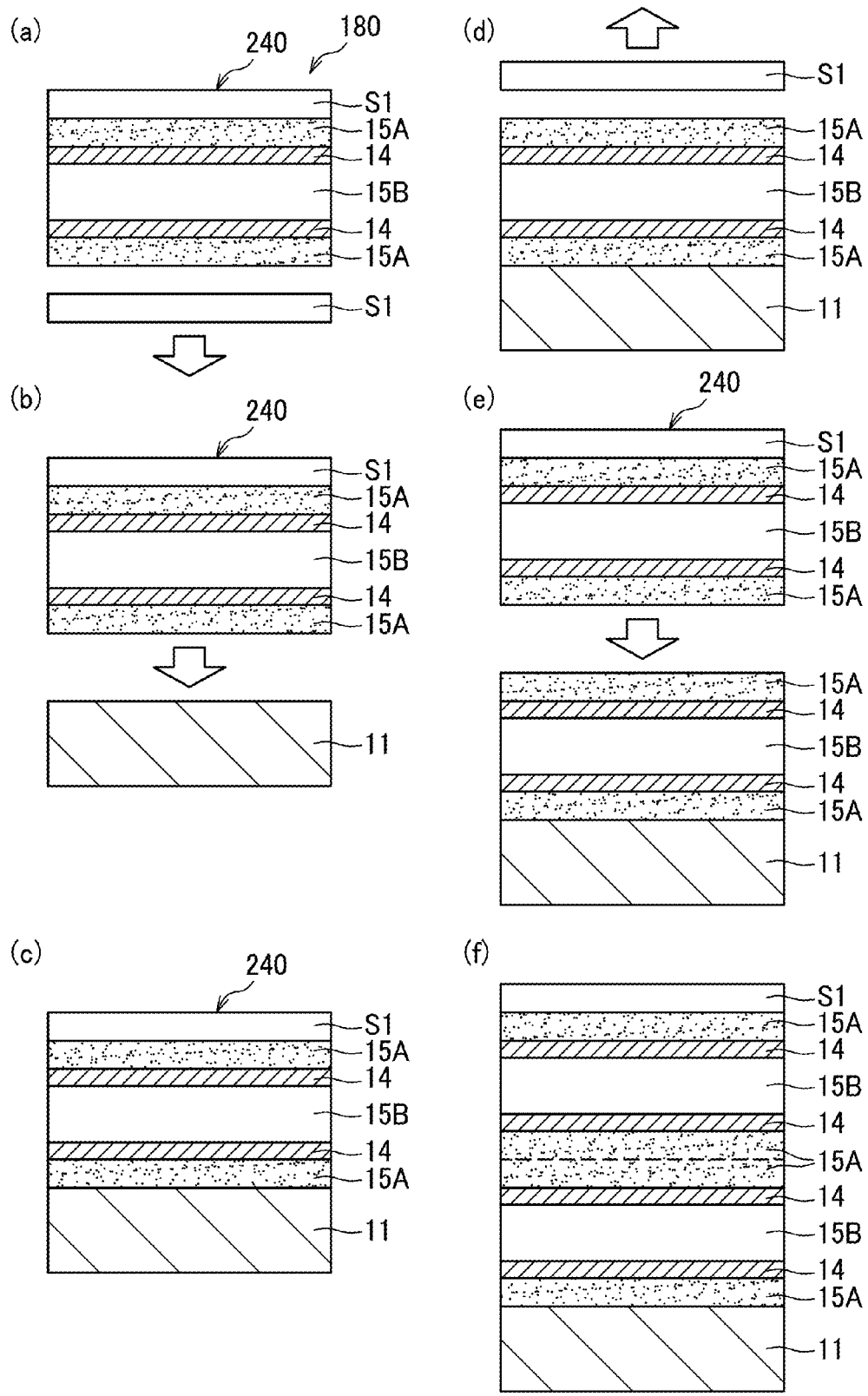
FIG. 11 is a diagram for explaining a method for manufacturing a multilayer optical information recording medium using a multilayer structure sheet according to the modified example.

First, as shown in FIG. 11(a), one of the first release sheets S1 of the multilayer structure sheet 180 is removed, to obtain a fifth multilayer structure sheet 240 with an exposed pressure sensitive adhesive layer 15A.

Next, as shown in FIG. 11(b), the exposed pressure sensitive adhesive layer 15A of the fifth multilayer structure sheet 240 is stuck to the substrate 11, and the fifth multilayer structure sheet 240 is stacked on the substrate 11. In this way, as shown in FIG. 11(c), a structure in which a unit structure is provided on the substrate 11 is formed.

Then, as shown in FIG. 11(d), the release sheet S1 is removed from the fifth multilayer structure sheet 240 stuck on the substrate 11, so that the pressure sensitive adhesive layer 15A arranged at the uppermost layer is exposed.

Next, as shown in FIG. 11(e), the exposed pressure sensitive adhesive layer 15A on the substrate 11 and the exposed pressure sensitive adhesive layer 15A of the fifth multilayer structure sheet 240 are laminated together. In this way, a structure having two unit structures is formed on the substrate 11. Subsequently, in the same manner, the fifth multilayer structure sheets 240 are stacked thereon, and finally the first release sheet S1 is removed and a cover layer 16 is provided thereon. In this way, the optical information recording medium 10 as shown in FIG. 1 can be manufactured.

EXAMPLES

Experiment 1

Next, a description will be given of an experiment by which it has been confirmed that recording in an optical information recording medium can be achieved by causing deformation of a recording layer into a protrusive shape. It is however to be understood, as described above, that the present invention does not necessarily require a protrusively shaped recording layer.

1. Recording Material

Example 1

The recording material, used in Example 1, includes a polymer binder and a dye dispersed in the polymer binder.
(1) Polymer Binder
Polymethylmethacrylate (manufactured by SIGMA-ALDRICH Corporation) was used as a polymer binder.
(2) Dye
The following two-photon absorption dye was used as a dye.

[Chem. 4]

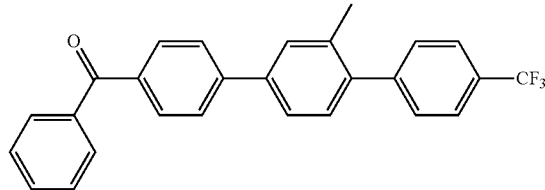

C-2

2. Method for Forming Recording Layer

The dye and the polymer binder were stirred and dissolved in a solvent (methyl ethyl ketone; MEK) to prepare a coating liquid, which was applied to a glass substrate by spin coating to form a film thereon. The thickness of the film was 1 μm. The refractive index of the glass substrate was 1.53.

The composition of the coating liquid was as follows:

| | |
|---|---|
| Solvent: | 7 g |
| Dye: | 72 mg |
| Polymer binder: | 500 mg |

3. Method for Experiment and Evaluation of Recording

The recording beam (pulsed laser: wavelength of 405 nm, repetition frequency of 76 MHz, and pulse width of 2 psec) was applied to the recording layer with the to peak power of 20 W (average power of 1.5 mW). After the focal position of the recording beam was adjusted in the recording layer, and the power of the recording beam was fixed, recording was performed with the recording time (irradiation time) changed in a range from 1 μs to 100 μs.

Figure 12:
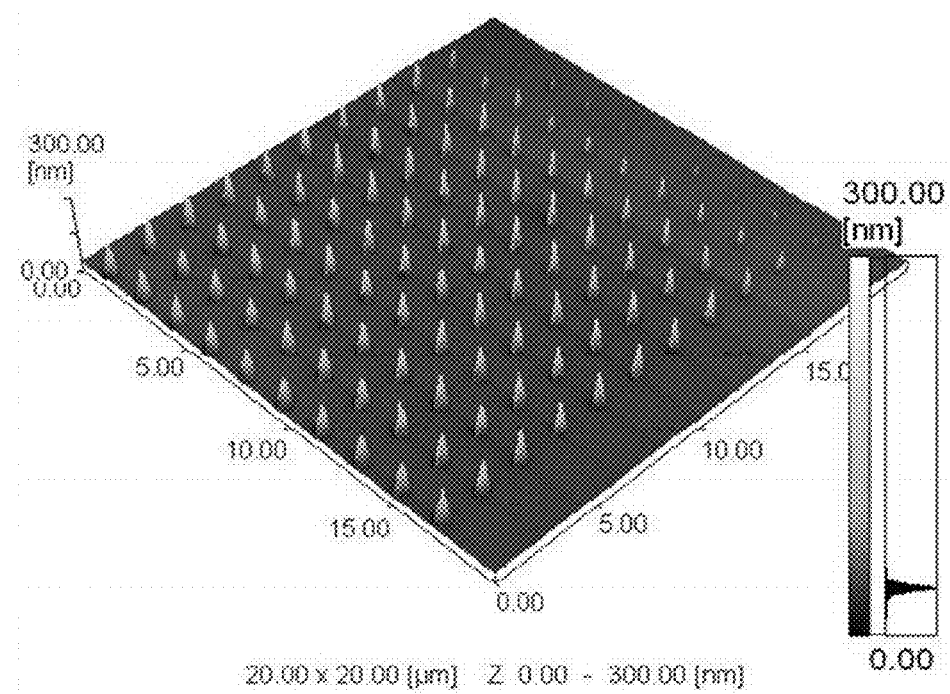
FIG. 12 is an image of the recording spots observed by an atomic force microscope.
Figure 13:
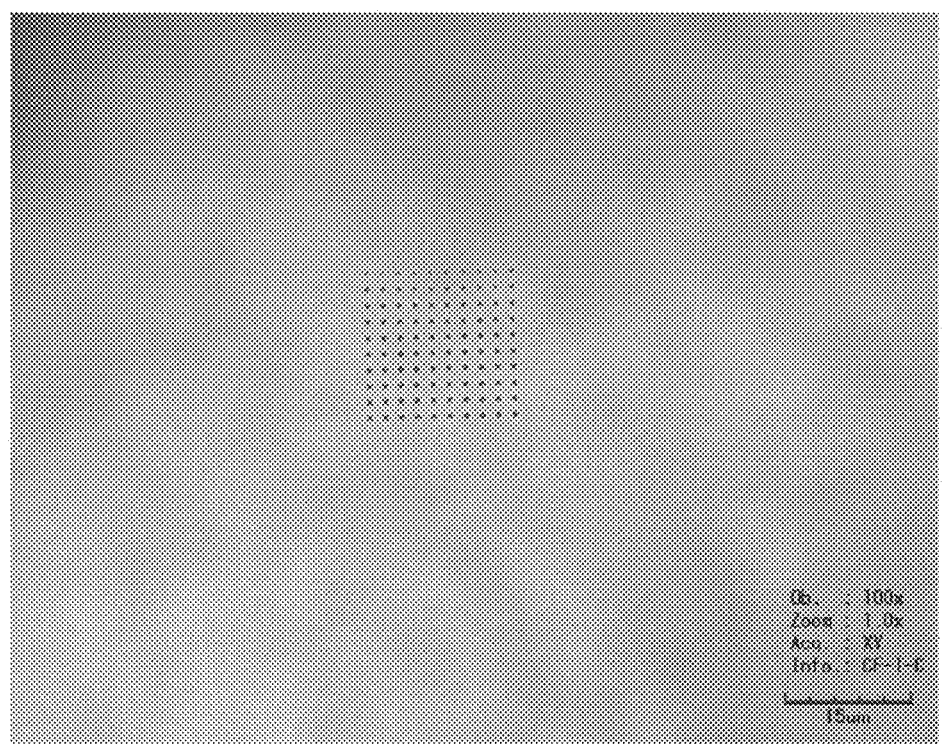
FIG. 13 is an image of the recording spots observed by a laser microscope.

The resulting recording spots were observed by an atomic force microscope (AFM) and a laser microscope. The conditions of observation were as follows:

Device: Nano Search Microscope OLS-3500 (manufactured by Olympus Corporation)
AFM measurement
Observation conditions:
Dynamic mode, Scanning range of 20 μm, scanning speed of 0.5 Hz High-aspect-ratio probe AR5-NCHR-20 (manufactured by Nano World AG) was used.
Laser microscope measurement
Observation conditions:
Object lens ×100, Confocal observation
4. Results The shapes of the recording spots were measured by using AFM, and the results represented three-dimensionally are shown in FIG. 12, and the recording spots were observed by using the laser microscope, and the obtained image is shown in FIG. 13. As shown in FIG. 12, the recording spots each have a protrusive shape. In FIG. 12, the recording time is shown as increasing from the rightward-and-backward position toward the leftward-and-frontward position. As shown in FIG. 13, the recording spots can be clearly distinguished by observation using the laser microscope, and it has thus been shown that optical reading by using a laser can be carried out successfully.

Experiment 2

Next, a description will be given of an experiment conducted to evaluate manufacturing methods by cracking which may appear in the recording layer depending upon the method applied.
1. Materials
(1) Recording Layer
  The same materials were used as those used in Example 1.
(2) Pressure Sensitive Adhesive Layer
  Acrylic ester-based adhesive was used.
(3) Recording Layer Support Layer
  SD-640 (manufactured by DIC Corporation)
(4) Release Sheet
  Polyethylene terephthalate film (with a silicone release layer applied on its surface)
2. Conditions of Examples and Comparative Examples
  Conditions of examples and comparative examples were as follows:

Example 2

A sheet in which a pressure sensitive adhesive layer, a recording layer, a recording layer support layer and a recording layer stacked in this order are laminated on a release sheet was prepared as Example 2.
(1) Manufacturing Method
(1-1) Applying pressure sensitive adhesive layer to a release sheet by the bar coating method to obtain an A-sheet.
(1-2) Applying a recording layer support layer to a release sheet by the bar coating method, and irradiating the same with a UV light (xenon lamp); then, applying a recording layer to the cured recording layer support layer by the bar coating method to obtain a B-sheet.
(1-3) Laminating the pressure sensitive adhesive layer of the A-sheet and the recording layer of the B-sheet, thereby stacking the B-sheet on the A-sheet to obtain a C-sheet.
(1-4) Removing the release sheet provided on the recording layer support layer of the C-sheet, and applying a recording layer to the recording layer support layer by the bar coating method.
(2) Thicknesses of the Layers

| Pressure sensitive adhesive layer | 10 μm |
| Recording layer | 1 μm |
| Recording layer support layer | 10 μm |

Comparative Example 1

A sheet in which a release sheet, a pressure sensitive adhesive layer, a recording layer and a release sheet are stacked in this order was prepared as Comparative example 1
(1) Manufacturing Method
(1-1) Applying a recording layer by the bar coating method to a release sheet to which a releasing agent having a lower-grade releasing property than the release sheet of the A-sheet has been applied, to obtain a D-sheet.
(1-2) Laminating the pressure sensitive adhesive layer of the A-sheet and the recording layer of the D-sheet.
(2) Thicknesses of the Layers

| Pressure sensitive adhesive layer | 10 μm |
| Recording layer | 1 μm |

3. Evaluation Method

First, the release sheet attached to the pressure sensitive adhesive layer was removed, and the exposed pressure sensitive adhesive layer was used to stick the sheet to the glass substrate. Thereafter, in Comparative example 1, the release sheet attached to the recording layer was removed. Each release sheet was removed by fixing the sheet with the release sheet attached thereto, then attaching an adhesive tape to the release sheet, and pulling the adhesive tape.

Next, the recording layers were observed via visual inspection and by using the laser microscope, and by these observations, the surfaces of all the recording layers were checked to determine whether or not cracking appeared on the surfaces.
4. Results In Example 2, no cracking was observed in all the recording layers.

In Comparative example, cracking was observed on the recording layer after removing the release sheet provided at the recording layer.

What is claimed is:

1. A multilayer structure sheet for manufacturing an optical information recording medium having a multilayer structure with a plurality of recording layers, the multilayer structure sheet comprising:
  at least one unit structure consisting of four layers of a pressure sensitive adhesive layer, a first recording layer, a recording layer support layer having a glass transition temperature higher than that of the pressure sensitive adhesive layer, and a second recording layer which are laminated in this order; and
  a release sheet attached to an outside of an outermost pressure sensitive adhesive layer.

2. The multilayer structure sheet according to claim 1, wherein the first and second recording layers include a polymer binder and a dye dispersed in the polymer binder, or include a polymer to which a dye is bonded.

3. The multilayer structure sheet according to claim 2, wherein the dye includes a multiphoton absorption compound.

4. The multilayer structure sheet according to claim 1, wherein the first and second recording layers have a thickness of 50 nm or greater.

5. The multilayer structure sheet according to claim 1, wherein a plurality of the unit structures are laminated on the release sheet.

6. The multilayer structure sheet according to claim 1, wherein the recording layer support layer includes an energy curable type resin.

7. The multilayer structure sheet according to claim 6, wherein the energy curable type resin is an ultraviolet curable resin.

8. The multilayer structure sheet according to claim 1, wherein a difference in refractive index for a recording beam between the recording layer support layer and the first and second recording layers is 0.05 or smaller.

9. The multilayer structure sheet according to claim 8, wherein the recording beam has a wavelength of 405 nm.

10. The multilayer structure sheet according to claim 9, wherein the recording beam has a wavelength of 405 nm.

11. The multilayer structure sheet according to claim 1, wherein a difference in refractive index for a recording beam between the pressure sensitive adhesive layer and the first and second recording layers is greater than a difference in refractive index for the recording beam between the recording layer support layer and the first and second recording layers.

12. The multilayer structure sheet according to claim 1, wherein each of the pressure sensitive adhesive layer and the recording layer support layer is of a material which is substantially nonabsorptive of a recording beam.

13. The multilayer structure sheet according to claim 1, wherein each of the pressure sensitive adhesive layer and the recording layer support layer has a thickness in a range of 2 to 20 micrometer.

14. A method for manufacturing a multilayer structure sheet according to claim 1, comprising:
a first step of forming a pressure sensitive adhesive layer on a first release sheet to obtain a first sheet;
a second step of forming a recording layer support layer on a second release sheet;
a third step of forming a first recording layer on the recording layer support layer to obtain a second sheet;
a fourth step of stacking the second sheet on the first sheet by laminating the pressure sensitive adhesive layer and the first recording layer together to obtain a third sheet;
a fifth step of removing the second release sheet from the third sheet to expose the recording layer support layer; and
a sixth step of forming a second recording layer on the recording layer support layer exposed in the fifth step to obtain a fourth sheet.

15. The method for manufacturing a multilayer structure sheet, according to claim 14, comprising:
a seventh step of removing the first release sheet from at least one of a plurality of the fourth sheets obtained by repeatedly performing the first to sixth steps to obtain one or more fifth sheets of which the pressure sensitive adhesive layer is exposed; and
an eighth step of stacking and sticking the one or more fifth sheets on the second recording layer of another fourth sheet which is an outermost layer.

16. A method for manufacturing an optical information recording medium having a multilayer structure with a plurality of recording layers, using a multilayer structure sheet according to claim 1, comprising:
a preliminary step of providing a plurality of multilayer structure sheets;
a release step of removing release sheets from the plurality of multilayer structure sheets to obtain first multilayer structure sheets of which the pressure sensitive adhesive layers are exposed;
a sticking step of sticking one first multilayer structure sheet to a substrate by laminating the exposed pressure sensitive adhesive layer of the first multilayer structure sheet on the substrate; and
a first laminating step of stacking another first multilayer structure sheet on the first multilayer structure sheet stuck to the substrate by laminating the another first multilayer structure sheet on the first multilayer structure sheet stuck to the substrate.

17. A method for manufacturing an optical information recording medium having a multilayer structure with a plurality of recording layers, using a multilayer structure sheet according to claim 1, comprising:
a preliminary step of providing a plurality of multilayer structure sheets which include a second multilayer structure sheet;
a release step of removing a release sheet from at least one multilayer structure sheet of the plurality of multilayer structure sheets other than the second multilayer structure sheet to obtain at least one third multilayer structure sheet having an exposed pressure sensitive adhesive layer;
a second laminating step of stacking the at least one third multilayer structure sheet on the second multilayer structure sheet by laminating the exposed pressure sensitive adhesive layer of the at least one third multilayer structure sheet on an outermost second recording layer of the second multilayer structure sheet or the at least one third multilayer structure sheet; and
a sticking step of sticking on a substrate the second multilayer structure sheet on which the at least one third multilayer structure sheet is stacked, by removing a release sheet of the second multilayer structure sheet with the at least one third multilayer structure sheet laminated thereon and laminating on the substrate a pressure sensitive adhesive layer thereof exposed by removing the release sheet.

18. An optical information recording medium having a multilayer structure with at least three recording layers,
wherein only one of a pressure sensitive adhesive layer and a recording layer support layer having a glass transition temperature higher than that of the pressure sensitive adhesive layer is provided between two adjacent recording layers; and
wherein the pressure sensitive adhesive layer and the recording layer support layer are disposed alternately with each other.

19. The optical information recording medium according to claim 18, wherein information is recordable by irradiation with a recording beam causing an interface between one of the two recording layers and the pressure sensitive adhesive layer to deform.

* * * * *